(12) United States Patent
Buffard et al.

(10) Patent No.: US 12,309,171 B2
(45) Date of Patent: *May 20, 2025

(54) SECURE COMMUNICATION BETWEEN IN-VEHICLE ELECTRONIC CONTROL UNITS

(71) Applicant: Nagravision Sàrl, Cheseaux-sur-Lausanne (CH)

(72) Inventors: Christophe Buffard, Phoenix, AZ (US); Sanjeev Sehgal, Phoenix, AZ (US)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,905

(22) Filed: Dec. 20, 2023

(65) Prior Publication Data

US 2024/0195813 A1    Jun. 13, 2024

Related U.S. Application Data

(63) Continuation of application No. 17/450,737, filed on Oct. 13, 2021, now Pat. No. 11,916,924, which is a
(Continued)

(51) Int. Cl.
*G06F 21/00*    (2013.01)
*G06F 21/57*    (2013.01)
(Continued)

(52) U.S. Cl.
CPC ............ *H04L 63/123* (2013.01); *G06F 21/57* (2013.01); *H04L 9/083* (2013.01); *H04L 9/3247* (2013.01);
(Continued)

(58) Field of Classification Search
CPC . H04L 63/123; H04L 63/068; H04L 63/0823; H04L 9/083; H04L 9/3247;
(Continued)

(56) References Cited

U.S. PATENT DOCUMENTS 9,705,678 B1    7/2017  Wang
10,009,325 B1 *  6/2018  David .................. H04L 9/16
(Continued)

FOREIGN PATENT DOCUMENTS

CN    103404112 A    11/2013
CN    105594156 A    5/2016
(Continued)

OTHER PUBLICATIONS

Philipp Mundhenk et al., Security in Automotive Networks: Lightweight Authentication and Authorization, Mar. 2017, ACM, vol. 22, No. 2, Article 25, pp. 25:1-25:27. (Year: 2017).*
(Continued)

*Primary Examiner* — Kari L Schmidt
*Assistant Examiner* — Fahimeh Mohammadi
(74) *Attorney, Agent, or Firm* — Maier & Maier, PLLC

(57) ABSTRACT

Aspects of the present disclosure address systems, methods, and devices for enabling secure communication between electronic control units (ECUs) in a vehicle. The system may include a first and second ECU from a plurality of ECUs in the vehicle. The first ECU is to enable secure communication between the plurality of ECUs by performing operations that include provisioning the second ECU with authentication data for authenticating messages exchanged with a third ECU and provisioning the third ECU with a set of security keys to enable the third ECU to securely exchange messages with the second ECU. The second ECU receives, from the third ECU, a secure message that is cryptographically signed using a security key from the set of security keys provi-
(Continued)

sioned to the third ECU, and the second ECU authenticates the secure message by comparing the authentication data with an authentication signal.

20 Claims, 13 Drawing Sheets

Related U.S. Application Data continuation of application No. 16/027,681, filed on Jul. 5, 2018, now Pat. No. 11,178,158.

(60) Provisional application No. 62/623,304, filed on Jan. 29, 2018.

(51) Int. Cl.
| | |
|---|---|
| H04L 9/08 | (2006.01) |
| H04L 9/32 | (2006.01) |
| H04L 9/40 | (2022.01) |
| H04L 67/12 | (2022.01) |
| H04W 4/40 | (2018.01) |

(52) U.S. Cl.
CPC .......... *H04L 9/3297* (2013.01); *H04L 63/068* (2013.01); *H04L 63/0823* (2013.01); *H04L 67/12* (2013.01); *H04W 4/40* (2018.02); *H04L 2209/84* (2013.01)

(58) Field of Classification Search
CPC ... H04L 9/3297; H04L 67/12; H04L 2209/84; G06F 21/57; H04W 4/40
See application file for complete search history.

(56) References Cited

U.S. PATENT DOCUMENTS

| | | | |
|---|---|---|---|
| 11,178,158 B2 | 11/2021 | Buffard et al. | |
| 11,916,924 B2 | 2/2024 | Buffard et al. | |
| 2007/0130469 A1 | 6/2007 | Alrabady | |
| 2009/0235071 A1* | 9/2009 | Bellur ................ | H04W 12/082 |
| | | | 713/158 |
| 2013/0111582 A1* | 5/2013 | Forest ..................... | G06F 21/44 |
| | | | 726/19 |
| 2014/0040992 A1* | 2/2014 | Koide ................. | H04L 63/0442 |
| | | | 726/4 |
| 2014/0114497 A1* | 4/2014 | Miyake .............. | B60R 16/0231 |
| | | | 701/1 |
| 2016/0035147 A1* | 2/2016 | Huang ................. | H04L 9/3271 |
| | | | 701/31.4 |
| 2016/0205194 A1 | 7/2016 | Kishikawa et al. | |
| 2016/0205197 A1* | 7/2016 | Yasrebi ................. | H04L 67/14 |
| | | | 709/204 |
| 2016/0344705 A1* | 11/2016 | Stumpf ................ | H04L 9/3213 |
| 2017/0111177 A1 | 4/2017 | Oguma et al. | |
| 2017/0134164 A1* | 5/2017 | Haga ..................... | G06F 21/445 |
| 2018/0227120 A1* | 8/2018 | Takemori ................ | G06F 21/44 |
| 2018/0234446 A1* | 8/2018 | Conner .................. | H04W 4/48 |
| 2018/0295112 A1* | 10/2018 | Coppola ................. | H04W 4/48 |
| 2019/0068361 A1* | 2/2019 | Ye ........................... | H04W 4/48 |
| 2019/0238555 A1 | 8/2019 | Buffard et al. | |
| 2020/0151972 A1 | 5/2020 | Nakajima et al. | |
| 2022/0094695 A1 | 3/2022 | Buffard et al. | |

FOREIGN PATENT DOCUMENTS

| | | |
|---|---|---|
| CN | 106533655 A | 3/2017 |
| CN | 107079007 A | 8/2017 |
| CN | 111788811 A | 10/2020 |
| CN | 111788811 B | 11/2022 |
| CN | 115776385 A | 3/2023 |
| EP | 3041196 A1 | 7/2016 |
| IN | 202017032825 A | 9/2020 |
| JP | 2015136107 A | 7/2015 |
| JP | 2017079369 A | 4/2017 |
| JP | 6260067 B1 | 12/2017 |
| JP | 7159328 B2 | 10/2022 |
| KR | 20130076519 A | 7/2013 |
| KR | 20160093764 A | 8/2016 |
| KR | 20170055648 A | 5/2017 |
| KR | 20170077003 A | 7/2017 |
| KR | 20230079487 A | 6/2023 |
| WO | WO-2015170451 A1 | 11/2015 |
| WO | WO-2017042012 A1 | 3/2017 |
| WO | WO-2019145488 A1 | 8/2019 |

OTHER PUBLICATIONS

Ali Shuja Siddiqui et al., Secure Ccommunication over CANBus, Aug. 6-9, 2017, IEEE, pp. 1264-1267. (Year: 2017).*
Samir Fassak et al., A secure protocol for session keys establishment between ECUs in the CAN bus, Nov. 1-4, 2017, IEEE, pp. 1-6. (Year: 2017).*
Samuel Woo et al., A Practical Security Architecture for In-Vehicle CAN-FD, Aug. 2016, IEEE, vol. 17, Issue: 8, pp. 2248-2261. (Year: 2016).*
"U.S. Appl. No. 16/027,681, Examiner Interview Summary mailed Apr. 19, 2021", 2 pgs.
"U.S. Appl. No. 16/027,681, Examiner Interview Summary mailed Aug. 1, 2019", 2 pgs.
"U.S. Appl. No. 16/027,681, Final Office Action mailed Feb. 18, 2021", 33 pgs.
"U.S. Appl. No. 16/027,681, Non Final Office Action mailed Oct. 7, 2020", 28 pgs.
"U.S. Appl. No. 16/027,681, Notice of Allowance mailed Jul. 14, 2021", 16 pgs.
"U.S. Appl. No. 16/027,681, Response filed May 12, 2021 to Final Office Action mailed Feb. 18, 2021", 14 pgs.
"U.S. Appl. No. 16/027,681, Response filed Dec. 30, 2020 to Non Final Office Action mailed Oct. 7, 2020", 16 pgs.
"U.S. Appl. No. 17/450,737, Notice of Allowance mailed Sep. 27, 2023", 17 pgs.
"U.S. Appl. No. 17/450,737, Preliminary Amendment filed Dec. 9, 2021", 9 pgs.
"Brazilian Application Serial No. BR1120200151335, Voluntary Amendment Filed Oct. 8, 2021", with machine English translation, 2 pages.
"Chinese Application Serial No. 201980010337.1, Office Action mailed Jan. 13, 2022", with English translation, 23 pgs.
"Chinese Application Serial No. 201980010337.1, Office Action mailed Jun. 16, 2022", with machine translation, 5 pgs.
"Chinese Application Serial No. 201980010337.1, Response filed May 26, 2022 to Office Action mailed Jan. 13, 2022", w/ English Claims, 21 pgs.
"Chinese Application Serial No. 201980010337.1, Response filed Aug. 9, 2022 to Office Action mailed Jun. 16, 2022", with English translation of claims, 62 pgs.
"European Application Serial No. 19701854.2, Communication Pursuant to Article 94(3) EPC mailed Feb. 15, 2023", 5 pgs.
"European Application Serial No. 19701854.2, Response filed Feb. 9, 2021 to Communication pursuant to Rules 161(1) and 162 EPC mailed Sep. 8, 2020", 28 pgs.
"European Application Serial No. 19701854.2, Response filed May 30, 2023 to Communication Pursuant to Article 94(3) EPC mailed Feb. 15, 2023", 20 pgs.
"Indian Application Serial No. 202017032825, First Examination Report mailed Apr. 28, 2022", 6 pgs.
"Indian Application Serial No. 202017032825, Response filed Aug. 18, 2022 to First Examination Report mailed Apr. 28, 2022", 31 pgs.
"International Application Serial No. PCT/EP2019/051877, International Preliminary Report on Patentability mailed Aug. 13, 2020", 8 pgs.
"International Application Serial No. PCT/EP2019/051877, International Search Report mailed Feb. 27, 2019", 5 pgs.
"International Application Serial No. PCT/EP2019/051877, Written Opinion mailed Feb. 27, 2019", 6 pgs.

(56) References Cited

OTHER PUBLICATIONS

"Japanese Application Serial No. 2020-541346, Notification of Reasons for Refusal mailed Nov. 2, 2021", with English translation, 9 pages.

"Japanese Application Serial No. 2020-541346, Notification of Reasons for Rejection mailed Jun. 14, 2022", W/English Translation, 4 pgs.

"Japanese Application Serial No. 2020-541346, Response filed Jan. 13, 2022 to Notification of Reasons for Refusal mailed Nov. 2, 2021", with English claims, 22 pages.

"Japanese Application Serial No. 2020-541346, Response filed Aug. 24, 2022 to Notification of Reasons for Rejection mailed Jun. 14, 2022", w/ English claims, 15 pgs.

"Korean Application Serial No. 10-2020-7024956, Voluntary Amendment Filed Oct. 18, 2021", with English translation, 26 pages.

Ali, Shuja Siddiqui, et al., "Secure Communication over CANBus", IEEE, (Aug. 6-9, 2017), 1264-1267.

Philipp, Mundhenk, et al., "Security in Automotive Networks: Lightweight Authentication and Authorization", ACM, vol. 22 No. 2, Article 25, (2017), 1-25.

Ramsey, Jonathon, "Mark Reuss comments on the C8 Corvette's encrypted ECU", [Online]. Retrieved from the Internet: <https://www.autoblog.com/2019/06/04/c8-corvette-encrypted-ecu-mark-reuss/>, (Jun. 4, 2019), 8 pages.

Samir, Fassak, et al., "A secure protocol for session keys establishment between ECUs in the CAN bus", IEEE, (Nov. 1-4, 2017), 1-6.

Samuel, Woo, et al., "A Practical Security Architecture for In-Vehicle CAN-FD", IEEE, vol. 17, Issue: 8, (2016), 2248-2261.

\* cited by examiner

SECURE COMMUNICATION BETWEEN IN-VEHICLE ELECTRONIC CONTROL UNITS

PRIORITY CLAIM

This application is continuation of U.S. patent application Ser. No. 17/450,737, entitled "SECURE COMMUNICATION BETWEEN IN-VEHICLE ELECTRONIC CONTROL UNITS," filed on Oct. 13, 2021, which is a continuation of U.S. patent application Ser. No. 16/027,681, entitled "SECURE COMMUNICATION BETWEEN IN-VEHICLE ELECTRONIC CONTROL UNITS," filed on Jul. 5, 2018, which is a non-provisional of, and claims the benefit of priority under 35 U.S.C. § 119(e) from, U.S. Provisional Application Ser. No. 62/623,304, entitled "AUTOMATED SECURE INCLUSION OF AUTOMOTIVE ECUS INTO A TRUST ZONE," filed on Jan. 29, 2018, which are hereby incorporated by reference.

TECHNICAL FIELD

The subject matter disclosed herein relates to security in vehicular computer systems including electronic control units (ECUs). Example embodiments address techniques for secure communication in vehicular computer systems, such as communication between ECUs.

BACKGROUND

Vehicles such as automobiles, boats, trains, and planes are typically made of discrete components that are assembled on an assembly line. These components may include a computer system comprised of several electronic control units (ECUs). ECUs can be embedded systems that each control one or more electrical systems or subsystems in the vehicle. An increase in the number of ECUs in turn increase the vulnerability of security in vehicular computer systems. Such vulnerability may enable cyber threats which lead to rogue or malicious control. Currently, the ways in which all ECUs are connected securely and in an automated way may be compromised.

BRIEF DESCRIPTION OF THE DRAWINGS

Various ones of the appended drawings merely illustrate example embodiments of the present subject matter and cannot be considered as limiting its scope.

DETAILED DESCRIPTION

Figure 1:
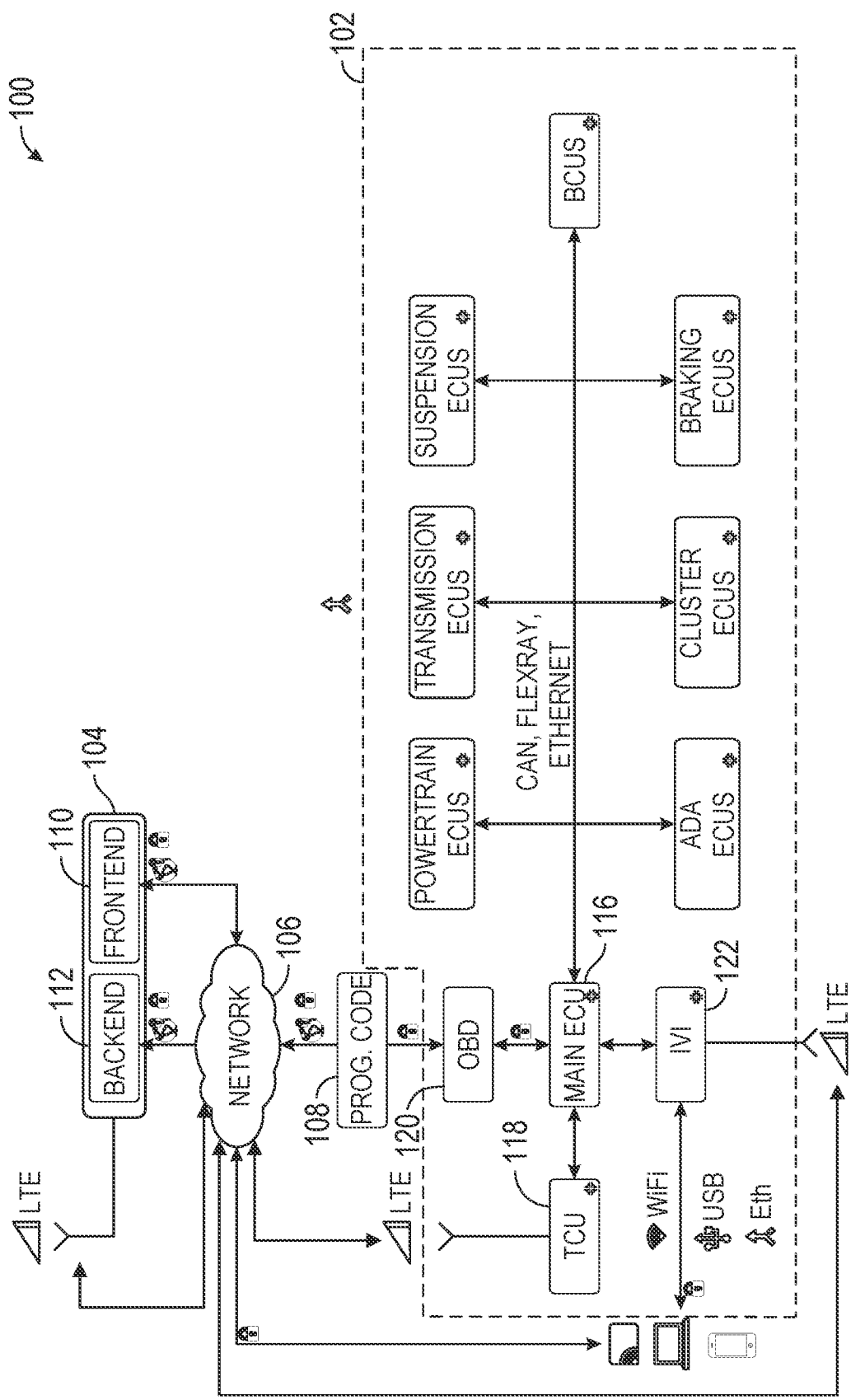
FIG. 1 is an architecture diagram illustrating a security system having an architecture for automating secure inclusion of vehicular electronic control units (ECUs) into a trusted zone, according to some embodiments.

Reference will now be made in detail to specific example embodiments for carrying out the subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure involve a security architecture for developing a system that enables secure communication within a vehicle between multiple components including electronic control units (ECUs). The security architecture enables secure Firmware Over-The-Air (FOTA) updates, secure Map Over-The-Air (MOTA) updates, secure communication between ECUs, secure vehicle-to-vehicle and vehicle-to-infrastructure (collectively referred to as "V2X") communications, and legitimate ECU replacement.

During the vehicle assembly process, the details of a vehicle's ECUs may or may not be known. For example, only the types of ECUs (e.g., gateway control unit (GCU), door control unit (DCU), telematics control unit (TCU), etc.) may be known. In another scenario, the precise ECUs going into a vehicle may be known. However, the security architecture described herein does not require an original equipment manufacturer (OEM) to precisely know details of components of the network that need to be secured, either at the time of deployment or after deployment. In this way, the security architecture enables ECUs to be secured with or without prior detailed knowledge of the ECUs. If the ECUs are connected to a main ECU (e.g., a central gateway), they can be identified, and this identity information can then be used to bring them into a trusted and secure network in an automated way.

Additional aspects of the present disclosure address techniques (e.g., systems, methods, or devices) for enabling secure communication between ECUs in a vehicle. The system may include at least a first ECU and a second ECU in a vehicle. The first ECU can be to communicatively link the multiple ECUs to enable secure communication between the ECUs. In communicatively linking the ECUs, the first ECU may provision the second ECU with authentication data for authenticating messages exchanged with a third ECU, and the first ECU may provision the third ECU with a set of security keys to enable the third ECU to exchange messages with the second ECU. The second ECU may receive, from the third ECU, a secure message that is cryptographically signed using a security key from the set of security keys provisioned to the third ECU. The second ECU may authenticate the secure message by comparing the authentication data with an authentication signal.

As an example, the authentication data may include a maximum message count that limits the number of messages that the third ECU may send to the second ECU, and the authentication signal may include a message counter corresponding to the number of messages sent to the second ECU by the third ECU. In this example, upon receiving a message from the third ECU, the second ECU may increment the message counter and compare the message counter to the maximum message count. If the message counter is less than or equal to the maximum message count, the second ECU successfully authenticates the message from the third ECU. If the message counter is greater than the maximum message count, the second ECU will be unable to successfully authenticate the message received from the third ECU.

As an example, the authentication data may include an expiration time for the security key used to cryptographically sign the message from the third ECU, and the authentication signal may include a clock signal. In this example, upon receiving a message from the third ECU, the second ECU compares the expiration time to the clock signal. If the expiration time has not passed, the second ECU successfully authenticates the message from the third ECU. If the expiration time has passed, the second ECU will be unable to successfully authenticate the message received from the third ECU.

In instances in which the second ECU is unable to successfully authenticate the message received from the third ECU, such as in the example discussed above, the second ECU may send a signal to the first ECU that indicates a failed security key authentication with respect to the third ECU. In response, the first ECU may limit the operation of the vehicle. For example, the first ECU may place the third ECU into a restricted mode of operation that restricts the third ECU from performing one or more operations. In addition, or alternatively, the first ECU may request, from a security service provided by a security sub-system, updated authentication data for updating the authentication data for the second ECU. In addition, or alternatively, the first ECU may request a new security key for the third ECU.

Security Architecture

With reference to FIG. 1, an example security system 100 is shown, according to some embodiments. The example security system 100 is configured for automated secure inclusion of vehicular ECUs into a trusted zone to enable the ECUs to securely communicate with one another. To avoid obscuring the subject matter with unnecessary detail, various functional components (e.g., services and engines) that are not germane to conveying an understanding of the subject matter have been omitted from FIG. 1. However, a skilled artisan will readily recognize that various additional functional components may be supported by the security system 100 to facilitate additional functionality that is not specifically described herein.

As is understood by skilled artisans in the relevant computer arts, the functional components illustrated in FIG. 1 may represent one or more components, such as a hardware component, a firmware component, or component having a set of executable instructions and the corresponding hardware (e.g., memory and processor) for implementing the instructions. Moreover, it shall be appreciated that while the functional components of FIG. 1 are discussed in the singular sense, in other embodiments, multiple instances of one or more of the components may be employed.

As illustrated in FIG. 1, the security system 100 includes a vehicular system 102 of an assembled vehicle in communication with a network-accessible security sub-system 104 providing a security service over a network 106. One or more portions of the network 106 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network, and any one of the components illustrated in FIG. 1 as being connected to the network 106 may be coupled to the network 106 via a Code Division Multiple Access (CDMA) connection, a Global System for Mobile communications (GSM) connection, or another type of cellular or wireless coupling. In this example, the coupling to the network 106 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

As shown, the security sub-system 104 includes one or more computer systems, such as a frontend server 110 and a backend server 112. The vehicular system 102 includes multiple control units such as assembled ECUs. For example, the vehicular system 102 may include one or more ECUs, such as a main ECU 116 (e.g., a "gateway"), a TCU 118, powertrain ECUs, transmission ECUs, suspension ECUs, brake control units (BCUs), ADA ECUs, cluster ECUs, and braking ECUs. The main ECU 116 is configured to communicate within the context of a secure environment with each of the ECUs of the vehicular system 102. Program code 108 (e.g., a software application comprising a set of machine-readable instructions that configures an executing machine to perform certain functionality), which may, for example, be embedded in or executed by the backend server 112, the main ECU 116, or a computer device (e.g., a security tool), facilitates communication between the main ECU 116 and the security sub-system 104 over the network 106. Further communications with the vehicular system 102 may be facilitated by an on-board diagnostic (OBD) system 120 that provides pinout, electrical, and protocol standards.

The TCU 118 controls the tracking of the vehicle and is configured to provide an external interface for mobile communications (e.g., GSM, GPRS, Wi-Fi, WiMAX, or LTE) that provides, via the network 106, the tracked values to a centralized geographical information system (GIS) database server (not shown), for example. In some embodiments, the TCU 118 may also enable the main ECU 116 to communicate directly with the security sub-system 104 without the need for the program code 108.

As shown, the main ECU 116 is also in communication with an in-vehicle infotainment (IVI) system 122 configured to present audio and video content to occupants of the vehicle. The IVI system 122 is also configured to communicate with one or more external systems (e.g., external content provisioning systems) over the network 106 through a communicative coupling (e.g., Wi-Fi, USB, or Ethernet) with one or more external devices.

In the context of the security system 100, during production of each ECU, a symmetric key is stored in a secure storage component or other secure element of each ECU (e.g., in an element that cannot be accessed by processes running on the ECU or by any processes running outside of the ECU). Additionally, during production of each ECU, a backend root certificate is stored in a non-modifiable storage of each ECU. Near the end of the assembly process of the vehicle, all assembled ECUs have only partial program code embedded that provides minimum functionality, but alone does not allow the vehicle to be operated. For example, the partial program code may enable the ECUs to communicate a unique identifier (e.g., a public key certificate) to the main ECU 116. The unique identifier of each ECU may be stored in a non-modifiable storage mechanism of the corresponding ECU during production. The partial program code may also facilitate other minor communications between ECUs to aid in validating the ECUs.

Consistent with some embodiments, the device or system executing the program code 108 may be connected to the main ECU 116 of the vehicle during the final assembly process by the vehicle manufacturer. The device or system executing the program code 108 may be connected to the main ECU 116 in one of at least two ways: 1) trusted communication may be established between the program code 108 and the main ECU 116 based on a shared secret (e.g., symmetric keys and asymmetric keys); or 2) no secure connection may be established, but this process may be implemented at the end of the vehicle assembly in a fully controlled and safe environment provided by the automotive OEM.

Once connected to the main ECU 116 (e.g., via the OBD system 120), the program code 108 obtains a list of unique identifiers (e.g., public key certificates) of all assembled ECUs in the vehicle from the main ECU 116. In instances in which the precise ECUs in the vehicle are known beforehand, the program code 108 does a comparison between the generated list and a known list (e.g., a manifest) to validate the legitimacy of the assembled ECUs. The known list may, for example, be retrieved by the program code 108 from the backend server 112. In another example, at least a portion of the known list may be provided by the producer of each ECU.

Once the ECUs have been validated, the program code 108 causes all ECUs to be communicatively linked in a manner that enables secure communication between the ECUs of the vehicular system 102. The program code 108 may issue a command to the main ECU 116 that causes the main ECU 116 to communicatively link the ECUs to enable secure communication between the ECUs. Upon receiving the command, the main ECU 116 provisions each ECU with a set of security keys (e.g., cryptographic keys) that links ECUs by enabling the ECUs to securely exchange messages with other ECUs. The main ECU 116 also provisions each ECU with authentication data for authenticating messages received from other ECUs. In some embodiments, the backend server 112 generates the security keys for all ECUs and provides them to the main ECU 116 via the program code 108. In some embodiments, the main ECU 116 may generate security key pairs for each ECU, or each individual ECU may produce its own security key pairs. Consistent with these embodiments, each ECU's public key is provided to the backend server 112 using the unique identifiers embedded in each ECU. One of many known techniques may be employed for generating and provisioning the security keys. For example, the security keys may be "secret keys" generated using known symmetric algorithms or may be "public keys" generated using known asymmetric algorithms.

Regarding the linking of the ECUs, depending on the embodiment, all ECUs may be linked with one another, each ECU may be individually linked with the main ECU 116, or some ECUs may be linked with one another while other ECUs are linked with only the main ECU 116. To enable such a communication scheme, any one of the ECUs may be provided with multiple security keys. Ultimately, the security keys with which each ECU is provisioned enable the communication with other ECUs, and thus, the security keys dictate which other ECUs any given ECU is permitted to communicate with. In this manner, each channel between two ECUs may be secured with a unique key.

Once provisioned with security keys, the ECUs may securely exchange information with each other. Depending on the embodiment, the information may be included in messages that are either encrypted or cryptographically signed with respective provisioned security keys. Depending on the embodiment, in exchanging information, the receiving ECU checks whether the signature is a known signature or whether the ECU has a key that allows it to encrypt a session negotiated between ECUs.

After the secure in-vehicle communication link has been established, the program code 108 then connects the main ECU 116 to the backend server 112, and the backend server 112 provisions the main ECU 116 with digital certificates (e.g., public key certificates) for each of the ECUs. More specifically, the backend server 112 provides the main ECU 116 with intermediate certificates signed with the backend root certificate to describe the certificate chain of trust. These digital certificates may be used by the ECUs to accept new firmware via, for example, a FOTA platform or service that completes the program code and makes the vehicle fully functional. This ensures that the vehicle's network is secure before it is operational. Each digital certificate signed with the backend root certificate or any certificate within the backend chain of trust is stored in the corresponding ECU.

When one of the ECUs is replaced, either by the original equipment manufacturer (OEM), at a dealer, or in an aftermarket facility, a secure connection is made between the main ECU 116 and the program code 108. The program code 108 establishes a secure connection with the security sub-system 104. The security sub-system 104 validates the program code 108 and provides a digital certificate via the backend server 112. The program code 108 identifies a unique identifier for the replacement ECU, the program code 108 or the backend server 112 validates the authenticity of the replacement ECU using the identifier, and the program code 108 uses the secure connection to deliver a certificate to the replacement ECU. A firmware update is then sent via a FOTA service to complete the program code on the replacement ECU and make it functional.

When an ECU determines that another ECU has been compromised (e.g., because of lack of keys), the ECU can report such information to the main ECU 116, any other ECU, or component which is capable of communicating with the security sub-system 204. The main ECU 116 can be designed for determining what action or actions to take to address or resolve an ECU that is compromised or may not be secure. For example, the main ECU 116 may place the vehicle into a "safe" mode in which the vehicle engine is limited in operation, though safety mechanisms of the vehicle (e.g., the braking system) are not limited. As an example, the "safe" mode may limit the vehicle to operating at a threshold number of revolutions per minute (RPM) or miles per hour (MPH). As another example, the "safe" mode may allow the vehicle to be driven in a normal mode for a limited distance (e.g., 100 miles) before switching it off completely. Once the main ECU 116 can connect to the security sub-system 104, the main ECU 116 may provide a report of the compromised ECU to the backend server 112.

Consistent with some embodiments, the security system 100 may implement techniques and Embedded Universal Integrated Circuit Card (eUICC) based Subscriber identity module (SIM) infrastructure to act as a hardware root of trust (RoT) to enable a secure network and manage security between a vehicle's ECUs using an LTE/GSMA/Global Platform framework. The security system 100 may leverage the ECUs' embedded ROT and an external secure element. This ROT or secure element can be stored in embedded pre-shared keys that are securely and secretly stored in a non-modifiable storage mechanism during the component production. The ECU ROT or the external secure element can store backend certificate authority (CA) certificates and an ECU unique identifier as well as additional data in a non-modifiable storage mechanism during the component production.

Figure 2:
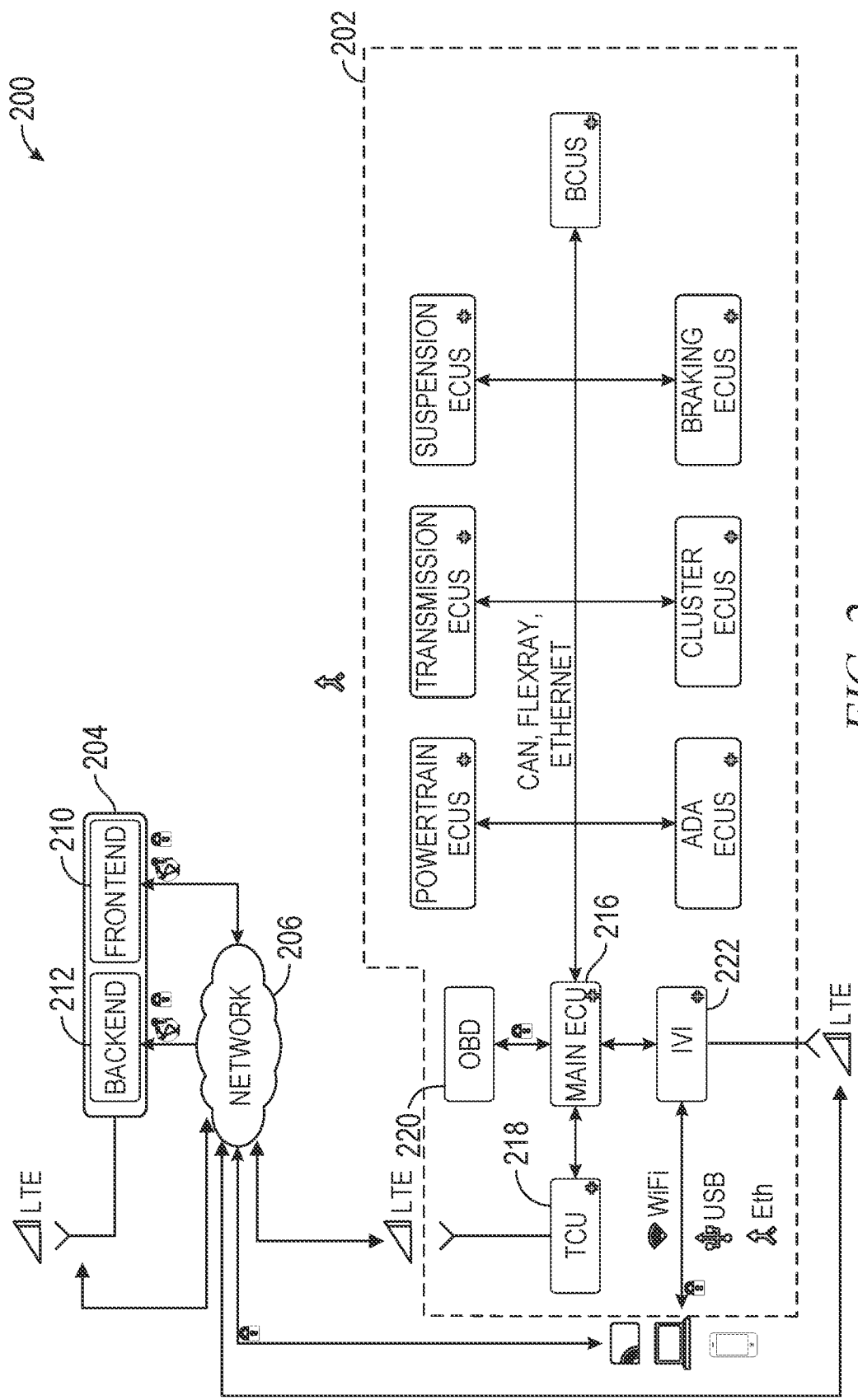
FIG. 2 is an architecture diagram illustrating a security system having an architecture for automated secure inclusion of vehicular ECUs into a trusted zone, according to some alternative embodiments.

In the embodiment illustrated in FIG. 1, the vehicular system 102 is in communication with the security sub-system 104 over the network 106 via the program code 108. However, in some embodiments, the vehicular system 102 may communicate directly with the security sub-system 104 to establish the trusted zone. For example, FIG. 2 illustrates a security system 200 configured for automated secure inclusion of vehicular ECUs into a trusted zone, according to some alternative embodiments. Like the security system 100, the security system 200 comprises a vehicular system 202 comprising ECUs, an OBD system 220, and an IVI system 222; and a security sub-system 204 comprising a frontend server 210 and a backend server 212. The ECUs of the vehicular system 202 include a main ECU 216 and a TCU 218. Each of the vehicular system 202 and the security sub-system 204 includes the same respective components and provides the same respective functionality as the vehicular system 102 and the security sub-system 104 of the security system 100.

However, unlike the security system 100, in the security system 200, the main ECU 216 can communicate, via a network 206, with the security sub-system 204 without the need for program code. The communication between the main ECU 216 and the security sub-system 204 may be enabled by the TCU 218 or by a communication component embedded in the main ECU 216. In the context of the security system 200, the main ECU 216 is configured to perform the functions of the program code 108 described above about FIG. 1

Figure 3:
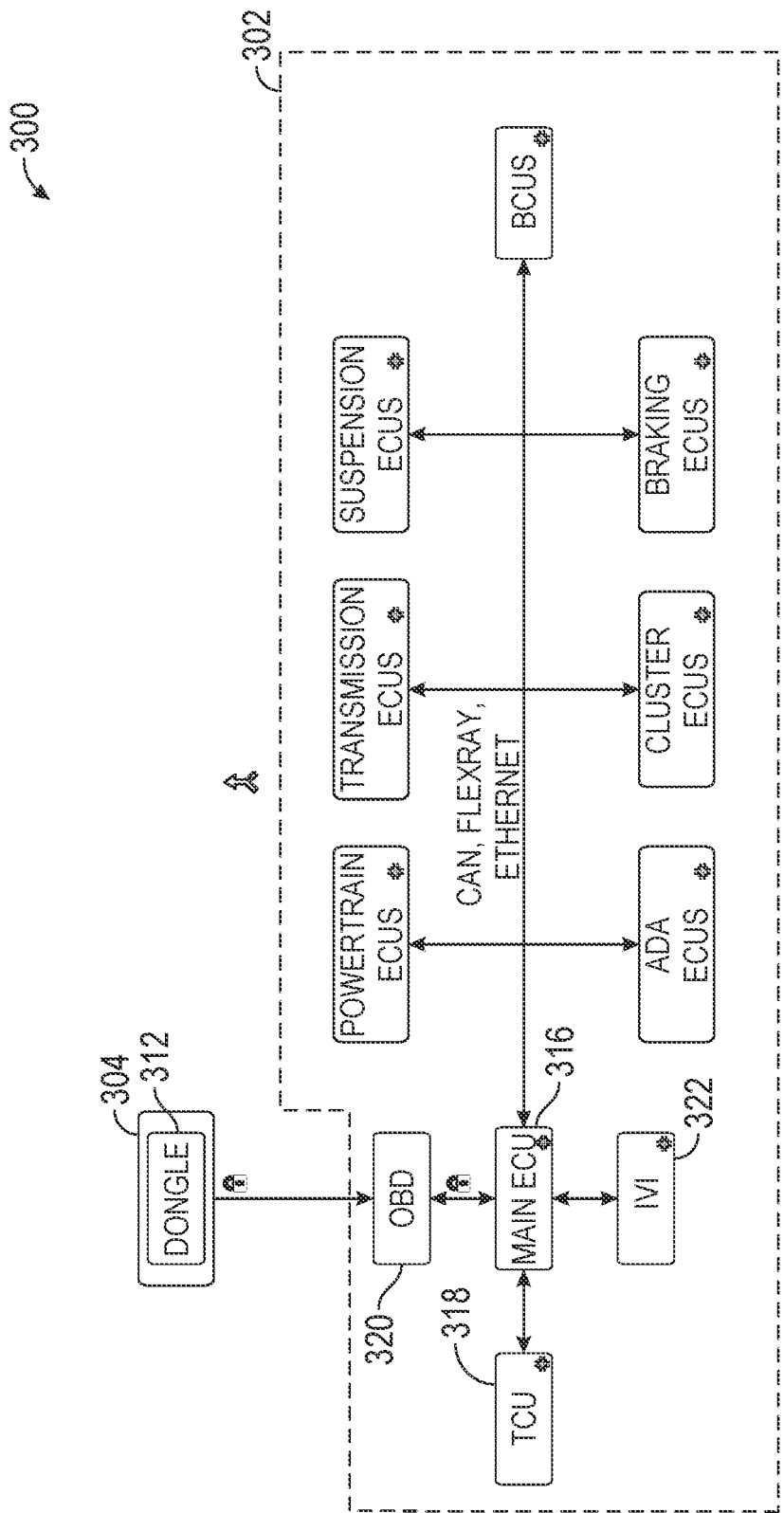
FIG. 3 is an architecture diagram illustrating a security system having an architecture for automated secure inclusion of vehicular ECUs into a trusted zone, according to some alternative embodiments.

Although FIGS. 1 and 2 illustrate a vehicular system in communication either directly or indirectly with a server-based security service over a network, in other embodiments, the security sub-system of the security system may instead comprise a mobile hardware device (e.g., a dongle) connected directly to the vehicular system. For example, FIG. 3 illustrates a security system 300 that includes a vehicular system 302 in communication with a dongle-based security sub-system 304.

Similar to the vehicular systems 102 and 202, the vehicular system 302 comprises ECUs including a main ECU 316 and a TCU 318; an OBD system 320; and an IVI system 322. Each of the components of the vehicular system 302 provides the same functionality as the corresponding component in the vehicular system 102 of the security system 100.

Unlike the security sub-systems 104 and 204 of the security systems 100 and 200, the security sub-system 304 simply comprises a dongle 312. The dongle 312 is a small mobile hardware device comprising at least a memory, a processor, and a means for communicating with at least the main ECU 316. In some embodiments, the dongle 312 may be or may include a mobile computing device such as a smartphone.

Depending on the embodiment, the vehicular system 302 may communicate with the dongle-based security sub-system 304 with or without the OBD system 320. As shown, the dongle-based security sub-system 304 may be connected directly to the vehicular system 302, and the dongle-based security sub-system 304 may communicate directly with the main ECU 316 over this connection. Depending on the capabilities of the vehicular system 302, the connection medium may, for example, be wireless (e.g., Bluetooth or Wi-Fi), wired (e.g., an Ethernet cable), a universal serial bus (USB), or a data bus.

Because the dongle-based security sub-system 304 may be connected directly to the vehicular system 302, the security system 300 may find an application in situations in which a network connection is unavailable, which typically arise in the context of ECU replacement. For example, prior to deployment, a separate network-connected device with appropriate security measures will download a limited-time credential to authenticate the dongle 312. Once the dongle 312 is authenticated, one or more digital certificates (e.g., public key certificates) and firmware for a replacement ECU may be downloaded to and stored encrypted on the memory of the dongle 312.

Once deployed in the field, the dongle 312 emulates the functionality of the server-based security services described above in reference to FIGS. 1 and 2. For example, the dongle 312 may be connected to the vehicular system 302, and both the digital certificate and firmware may be installed to the replacement ECU. This firmware update completes the program code on the replacement ECU to make it fully functional. The component list associated with the vehicle identification number (VIN) of the vehicle is updated with new component information.

In some embodiments, the firmware update provided to the replacement ECU by the dongle 312 completes the program code to make the replacement ECU fully functional for only a limited amount of time until the vehicle can be brought into a facility where a network connection is available and further information is able to be provided to the replacement ECU. As such, the firmware update provided by the dongle 312 may include an expiration time and/or date.

Enabling Secure Communication

Figure 4:
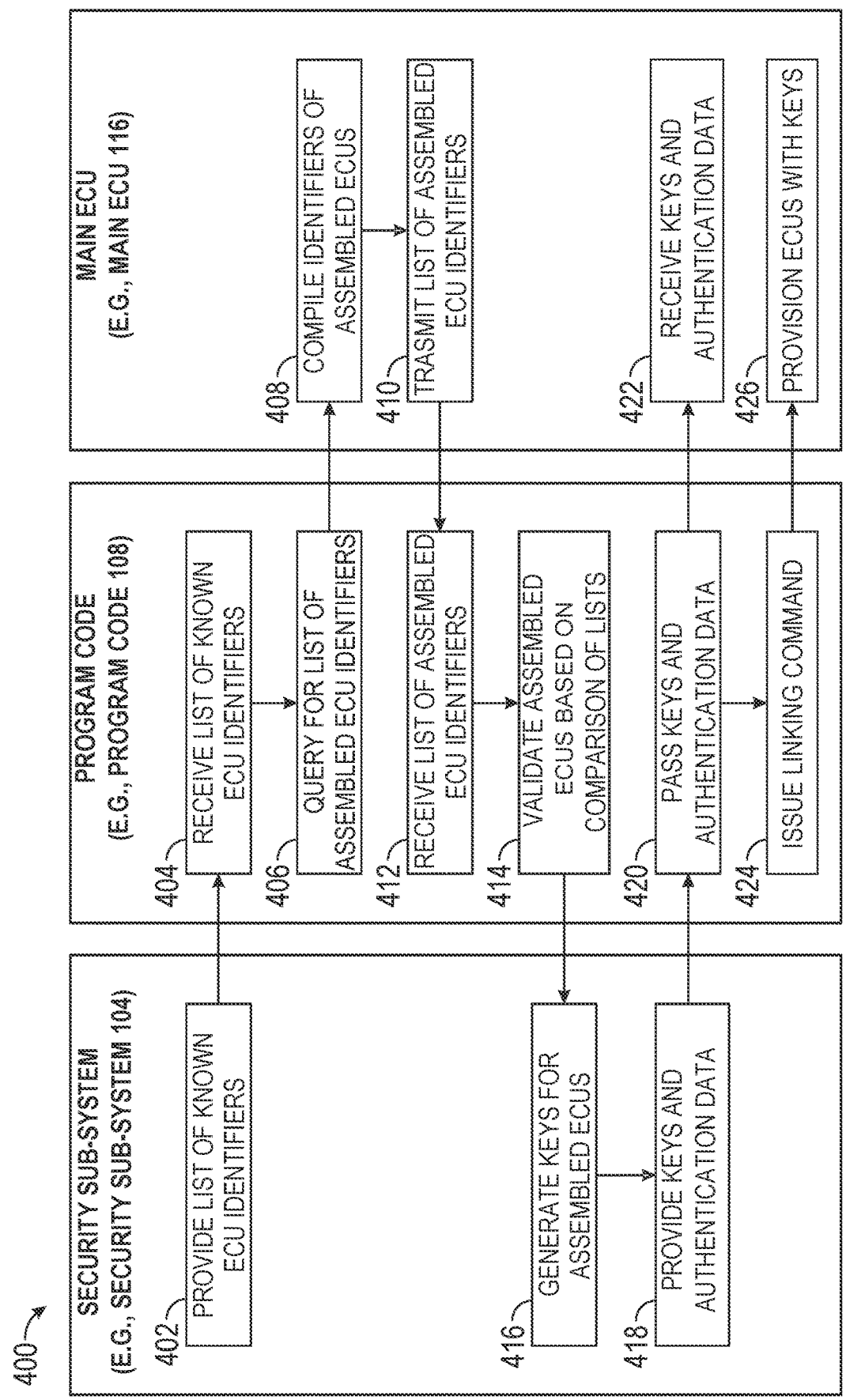
FIG. 4 is an interaction diagram illustrating interactions between components of a security system in performing a method for enabling secure communication between multiple ECUs of a vehicle, according to some embodiments.

FIG. 4 is an interaction diagram illustrating interactions between a security sub-system (e.g., security sub-system 104) that provides a security service, program code (e.g., program code 108), and a main ECU (e.g., main ECU 116) of a security system (e.g., security system 100) in performing a method 400 for enabling secure communication between ECUs of a vehicle (e.g., vehicular system 102), according to some embodiments. The method 400 may be embodied in computer-readable instructions for execution by one or more hardware components (e.g., a processor).

As shown in FIG. 4, the method 400 begins with the security sub-system providing a list of known ECU identifiers to the program code (operation 402). Each ECU identifier is a unique number associated with the corresponding ECU. These unique identifiers may, for example, correspond to public key certificates assigned to the ECUs. The list of known ECU identifiers is received by the program code (at operation 404). Each ECU identifier included in the list of known ECU identifiers corresponds to an ECU that is intended to be included in a particular vehicle undergoing configuration (e.g., an assembly process).

The program code queries the main ECU for a list of assembled ECU identifiers included in the assembled vehicle (operation 406). In turn, the main ECU compiles identifiers from each assembled ECU in the vehicle (operation 408). For example, the main ECU may ping each ECU with a request for an identifier. The unique identifier associated with each of the ECUs is stored in a non-modifiable storage mechanism of the corresponding ECU. As noted above, each of the ECUs initially only includes partial program code that provides minimal functionality such as the ability to communicate the unique identifier to the main ECU, but the partial program code does not allow the vehicle to be operational.

Once the complete list is compiled, the main ECU transmits the list of assembled ECUs to the program code (operation 410). Upon receiving the list of assembled ECU identifiers (at operation 412), the program code validates the authenticity of the assembled ECUs by comparing the list of known ECU identifiers to the list of assembled ECU identifiers (operation 414).

In some embodiment, once the authenticity of the assembled ECUs has been validated, the security sub-system generates security keys for each of the assembled ECUs along with authentication data (operation 416), and the security sub-system provides the security keys along with the authentication data to the program code (operation 418) over a secured (e.g., encrypted) channel. The program code, in turn, provides the security keys and authentication data for the assembled ECUs to the main ECU (operation 420) over the secured channel, and the main ECU receives the security keys and authentication data from the program code (operation 422).

In other embodiments, the main ECU generates the security keys rather than the security sub-system. In these embodiments, operations 416, 418, 420, and 422 may be omitted from the method 400. Further, in these embodiments, the main ECU notifies the security sub-system through the program code of each of the security keys corresponding to each of the ECUs, and the security sub-system may update its records accordingly.

With reference back to FIG. 4, the program code issues a linking command (operation 424) to the main ECU, and the main ECU, in turn, communicatively links the assembled ECUs (operation 426). The main ECU may link the assembled ECUs by provisioning each ECU with the corresponding security key(s) and authentication data. Once provisioned with security keys, the ECUs may securely exchange information with the main ECU, other ECUs, or combinations of both depending on how the security keys have been provisioned. For example, depending on the embodiment, all ECUs may be linked with one another, each ECU may be individually linked with the main ECU, or some ECUs may be linked with one another while other ECUs are linked with only the main ECU. To enable such a communication scheme, any one or more of the ECUs may be provided with multiple security keys. Ultimately, the security keys with which each ECU is provisioned enable communication with other ECUs, and thus, the security keys dictate which other ECUs any given ECU is permitted to communicate with. When exchanging a message with another ECU, a transmitting ECU signs the message with the security key(s) associated with the communication with the other ECU. In this manner, each channel between two ECUs may be secured with a unique key. Additionally, each ECU uses the authentication data to authenticate messages received from other ECUs. The authentication data includes one or more attributes related to communication with other ECUs such as, for example, temporal attributes that define a time window or expiration time for a particular security key, a message count attribute defining a maximum message count for which a particular security key may be used to sign messages, an operational attribute defining a particular operation an ECU is allowed to perform, or a component attribute defining a particular component within the vehicular system with which a particular ECU is allowed to communicate.

Securely Configuring ECU Firmware

Figure 5:
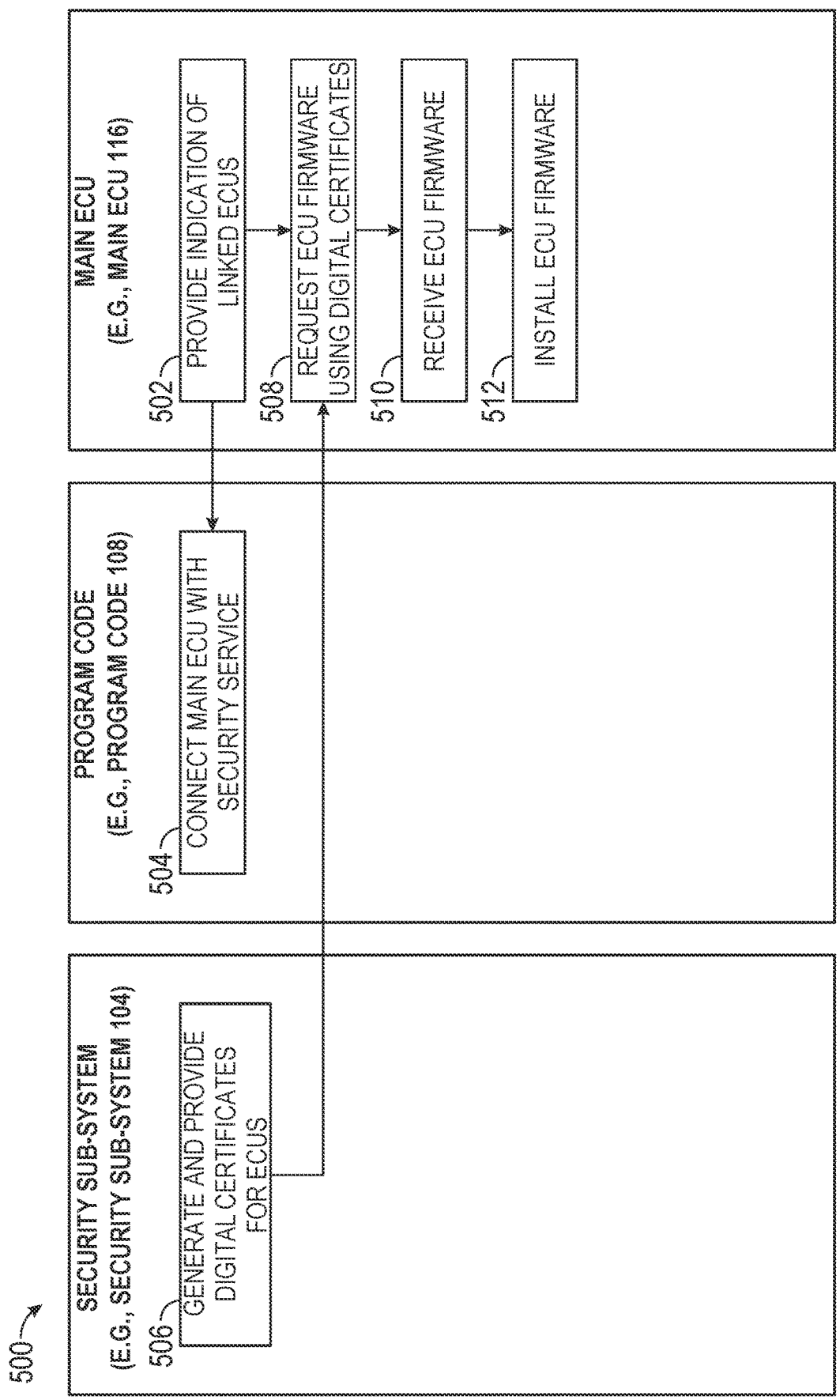
FIG. 5 is an interaction diagram illustrating interactions between components of a security system in performing a method for securely configuring firmware on multiple ECUs of a vehicle, according to some embodiments.

FIG. 5 is an interaction diagram illustrating interactions between a security sub-system (e.g., the security sub-system 104), program code (e.g., program code 108), and a main ECU (e.g., main ECU 116) of a security system (e.g., security system 100) in performing a method 500 for securely configuring firmware on multiple ECUs of a vehicle (e.g., vehicular system 102), according to some embodiments. The method 500 may be embodied in computer-readable instructions for execution by one or more hardware components (e.g., a processor). The operations of the method 500 may, for example, be performed subsequent to the operations of the method 400 described above.

As shown, the method 500 begins with the main ECU providing the program code with an indication that the ECUs of the vehicular system have been provisioned with security keys (operation 502). In response to receiving this indication, the program code connects the main ECU with the security sub-system (operation 504). The security sub-system generates digital certificates (e.g., public key certificates) for each of the ECUs and provides the digital certificates to the main ECU (operation 506). Upon receiving the digital certificates, the main ECU may request firmware data for configuring firmware on each of the ECUs from a FOTA service using the digital certificates of each ECU (operation 508). The main ECU receives the firmware data from the FOTA service (operation 510) and configures the corresponding firmware on each ECU (operation 512) using the firmware data. Once configured, the firmware completes the once partial program code embedded in the ECUs, thereby making the vehicle fully operational.

Securely Configuring Firmware on Replacement ECU

Figure 6:
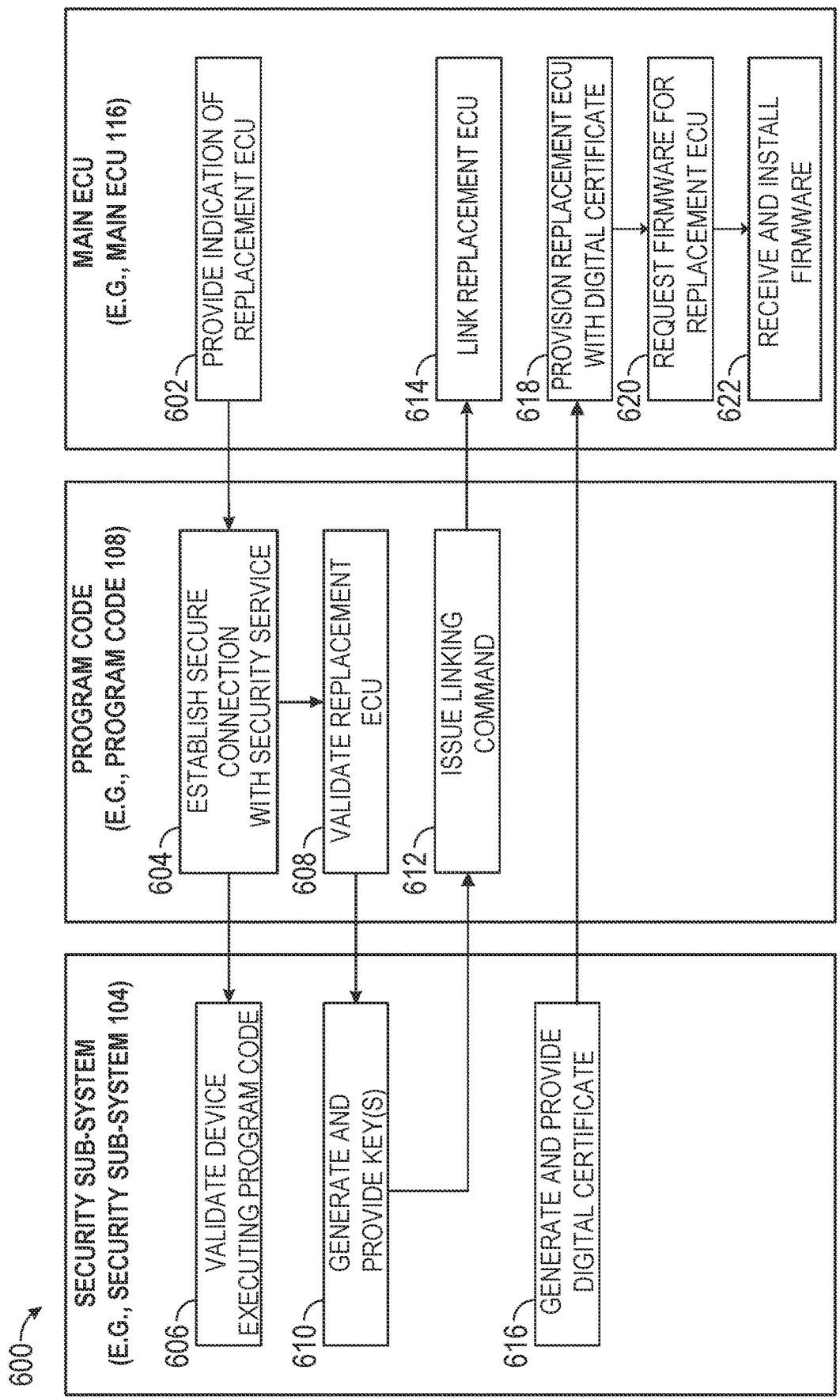
FIG. 6 is an interaction diagram illustrating interactions between components of a security system in performing a method for securely configuring firmware on a replacement ECU, according to some embodiments.

FIG. 6 is an interaction diagram illustrating interactions between a security sub-system (e.g., the security sub-system 104), program code (e.g., program code 108), and a main ECU (e.g., main ECU 116) of a security system (e.g., security system 100) in performing a method 600 for securely configuring firmware on a replacement ECU, according to some embodiments. The method 600 may be embodied in computer-readable instructions for execution by one or more hardware components (e.g., a processor).

As shown, the method 600 begins with the main ECU providing an indication to the program code that an ECU has been replaced (operation 602). The indication may include a unique identifier (e.g., a public key) associated with the replacement ECU. Initially, the replacement ECU includes only partial program code that alone does not allow the vehicle to be operational.

In response to receiving the indication from the main ECU, the program code establishes a secure connection with the security sub-system (operation 604). Upon establishing the secure connection, the security sub-system validates the authenticity of the device or system executing the program code (operation 606). The program code validates the replacement ECU based on the identifier received as part of the indication (operation 608).

Once the replacement ECU has been validated, the security sub-system generates and provides one or more security keys for the replacement ECU through the program code to the main ECU (operation 610). The program code issues a linking command to the main ECU (operation 612), and the main ECU, in turn, links the replacement ECU with one or more other ECUs (operation 614) by provisioning the replacement ECU with the one or more security keys. The replacement ECU, once provisioned with the one or more security keys, can securely communicate with the one or more other ECUs of the vehicular system. For example, the replacement ECU may use the one or more security keys to sign encrypted messages exchanged with another ECU. The replacement ECU may be provisioned with a security key for each other ECU the replacement ECU is authorized to communicate with. In this way, each channel between an ECU and the replacement ECU may be secured with a unique key.

Once the replacement ECU is linked with the other ECU(s) in the vehicular system, the security sub-system generates and provides a digital certificate (e.g., public key certificate) for the replacement ECU to the main ECU through the program code (operation 616). The main ECU 116 provisions the replacement ECU with the digital certificate (operation 618), which may be stored in a non-modifiable storage mechanism of the replacement ECU. The main ECU may then request firmware data for configuring firmware for the replacement ECU from a FOTA platform or service using the digital certificate (operation 620). Upon receiving the firmware data from the FOTA platform or service, the main ECU configures the firmware on the replacement ECU (operation 622). Once configured, the firmware completes the once partial program code embedded in the replacement ECU, thereby making the vehicle fully operational.

Securely Configuring Firmware on Replacement ECU Using Dongle

Figure 7:
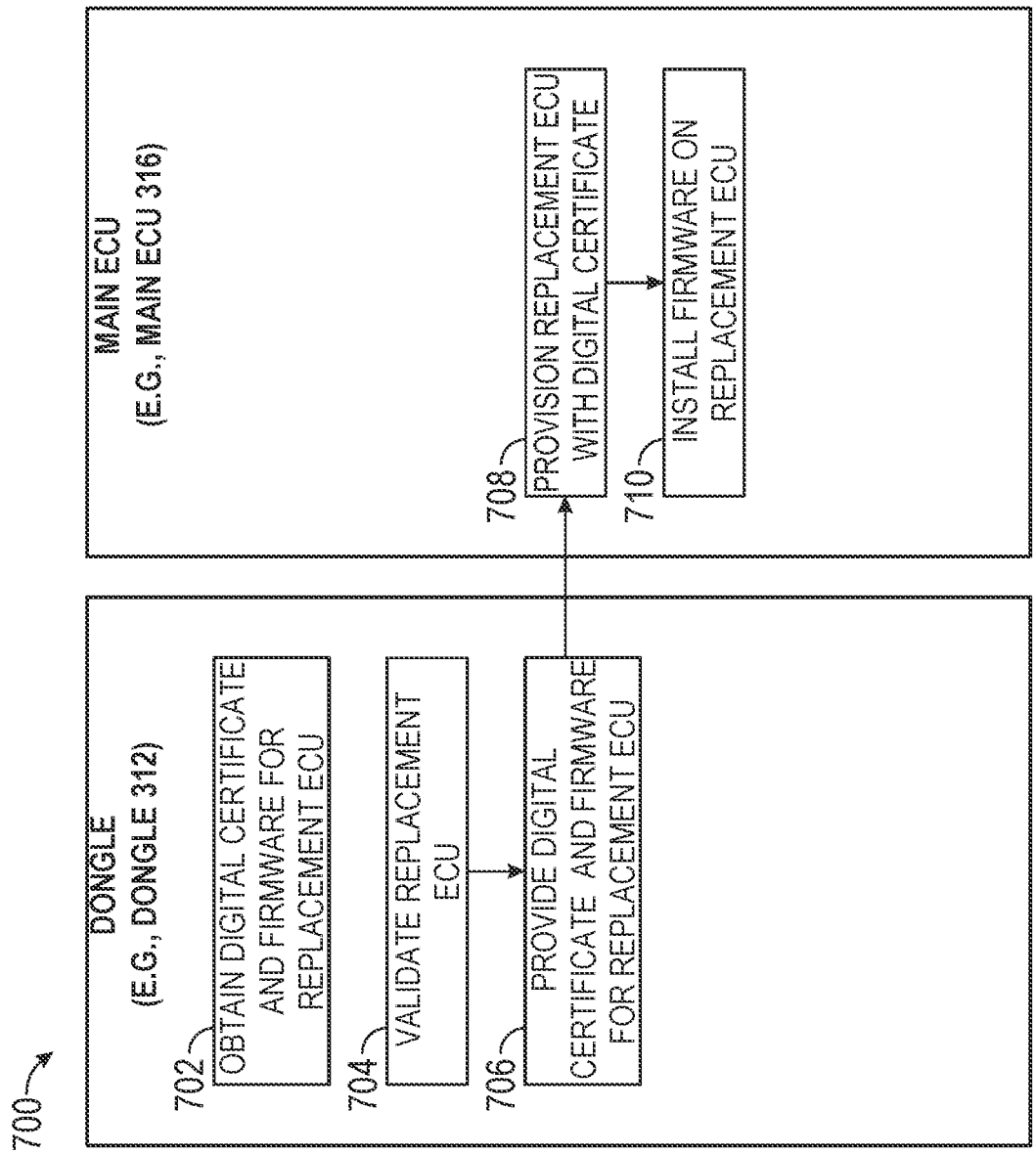
FIG. 7 is an interaction diagram illustrating interactions between components of a security system in performing a method for securely configuring firmware on a replacement ECU, according to some alternative embodiments.

FIG. 7 is an interaction diagram illustrating interactions between a dongle (e.g., dongle 312) and a main ECU (e.g., main ECU 316) of a security system (e.g., security system 300) in performing a method 700 for securely configuring firmware on a replacement ECU, according to some embodiments. The method 700 may be embodied in computer-readable instructions for execution by one or more hardware components (e.g., a processor).

As shown, the method 700 begins with the dongle obtaining a digital certificate and firmware for a replacement ECU (operation 702). The dongle may obtain the digital certificate and firmware from a server-based security service (e.g., the security sub-system 104) while the dongle has access to a network connection that allows it to communicate with the security service. The dongle validates the replacement ECU based on a unique identifier (e.g., a public key) associated with the replacement ECU (operation 704). The unique identifier may be stored in a non-modifiable storage mechanism of the replacement ECU and may be provided to the dongle by the main ECU. Upon validating the replacement ECU, the dongle provides the main ECU with the digital certificate and firmware for the replacement ECU (operation 706). At operation 706, the dongle may also issue a linking command to the main ECU. The linking operation may be performed using a temporary key (e.g., stored securely in the replacement ECU). This may allow a limited time to reach a workshop to terminate the replacement procedure when access to a network connection becomes available.

In response to receiving the linking command, the main ECU provisions the replacement ECU with the digital certificate (operation 708) and configures the firmware on the replacement ECU (operation 710). Once configured, the firmware completes the once partial program code embedded in the replacement ECU, thereby making the vehicle fully operational.

Functional Components of ECU

Figure 8:
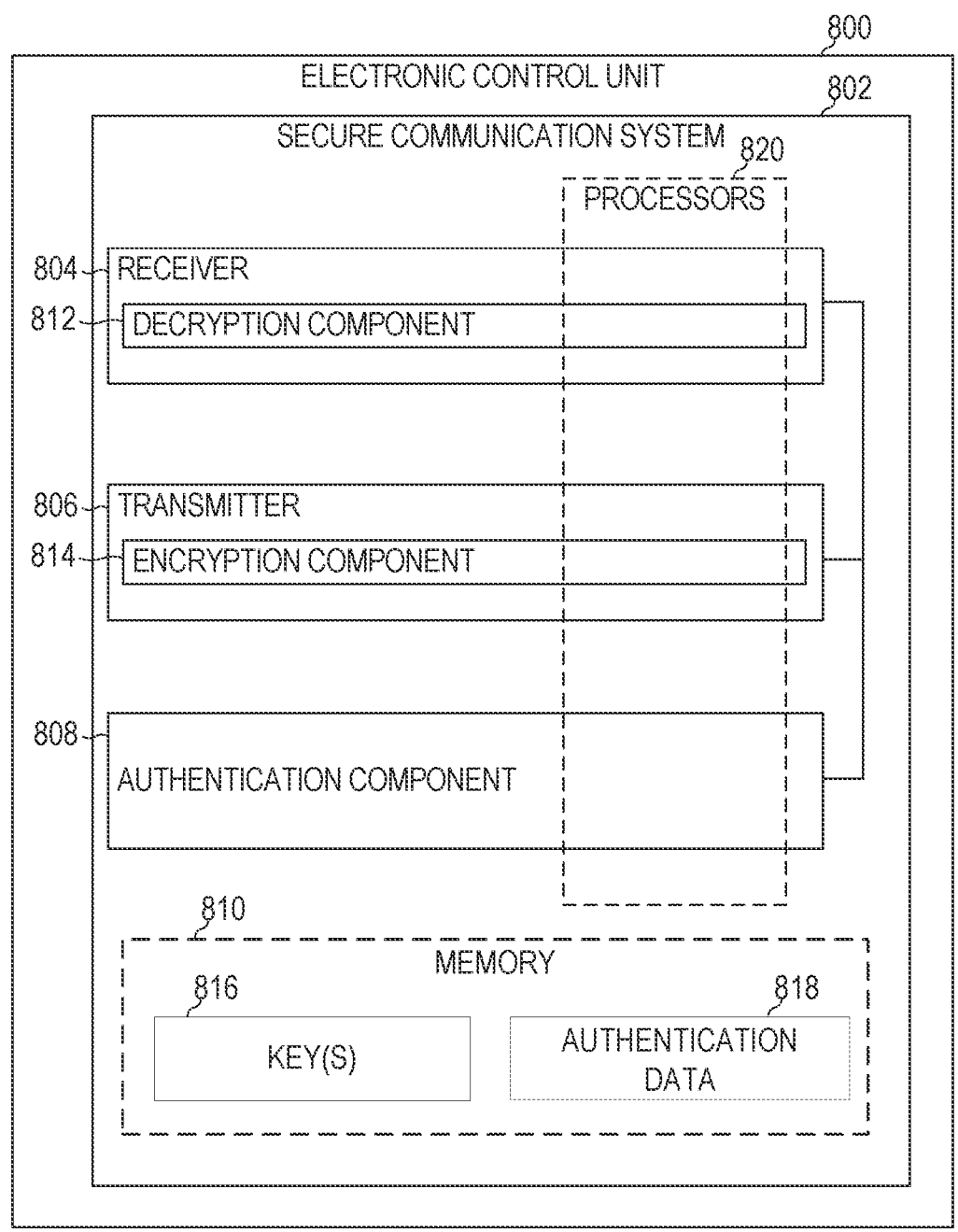
FIG. 8 is a system diagram illustrating functional components of an ECU, according to some embodiments.

FIG. 8 is a system diagram illustrating functional components of an ECU 800, according to some embodiments. The ECU 800 is an example of the ECUs illustrated in FIGS. 1-3 and discussed above about FIGS. 4-7. The ECU 800 is shown as including a secure communication system 802 that comprises a receiver 804, a transmitter 806, an authentication component 808, and a memory 810. The receiver 804 may comprise a decryption component 812, and the transmitter 806 may comprise an encryption component 814.

The functional components of the secure communication system 802 enable the ECU 800 to securely exchange messages with other ECUs in a vehicle. For example, the memory 810 stores security key(s) 816 that enable the ECU 800 to send secure (e.g., encrypted or cryptographically signed) messages to one or more other ECUs and decrypt encrypted messages received from the other ECUs. Further, the memory 810 also stores authentication data 818 for authenticating messages received from the other ECUs. The authentication data 818 includes one or more attributes related to communication with one or more other ECUs. The one or more attributes may, for example, include one or more of a temporal attribute that specifies an expiration time or time window for a security key, a message count attribute that specifies a maximum message count for a security key, an operational attribute that specifies one or more operations an ECU is permitted to perform, and a component attribute that specifies a component of the vehicle with which an ECU is permitted to communicate. As mentioned above, a main ECU (e.g., main ECU 116) of a vehicular system may provision the ECU 800 with the security key(s) 816 and authentication data 818.

The receiver 804 is responsible for receiving secure (e.g., encrypted or cryptographically signed) messages from other ECUs, and the decryption component 812 of the receiver 804 decrypts encrypted messages using one of the security key(s) 816 stored in the memory 810. The transmitter 806 is responsible for transmitting messages to other ECUs that are encrypted and/or cryptographically signed by the encryption component 814 using one of the security key(s) 816 stored in the memory 810. The authentication component 808 authenticates messages received from other ECUs. The authentication component 808 may authenticate a message received from another ECU by comparing the authentication data 818 for that ECU with an authentication signal maintained by the ECU 800. Further details regarding the authentication of messages are discussed below.

The various components of the secure communication system 802 may be configured to communicate with each other (e.g., via a bus, shared memory, or a switch). Any one or more of the components described may be implemented using hardware alone (e.g., one or more processors of a machine) or a combination of hardware and software. For example, any component of the secure communication system 802 may physically include an arrangement of one or more of processors 820 (e.g., a subset of or among the one or more processors of the machine) configured to perform the operations described herein for that component. As another example, any component of the secure communication system 802 may include software, hardware, or both, that configure an arrangement of one or more processors 820 (e.g., among the one or more processors of the machine) to perform the operations described herein for that component. Accordingly, different components of the secure communication system 802 may include and configure different arrangements of such processors 820 or a single arrangement of such processors 820 at different points in time. Moreover, any two or more components of the secure communication system 802 may be combined into a single component, and the functions described herein for a single component may be subdivided among multiple components. Furthermore, according to various example embodiments, components described herein as being implemented within a single machine, database, or device may be distributed across multiple machines, databases, or devices.

Secure Communication Between ECUs

Figure 9:
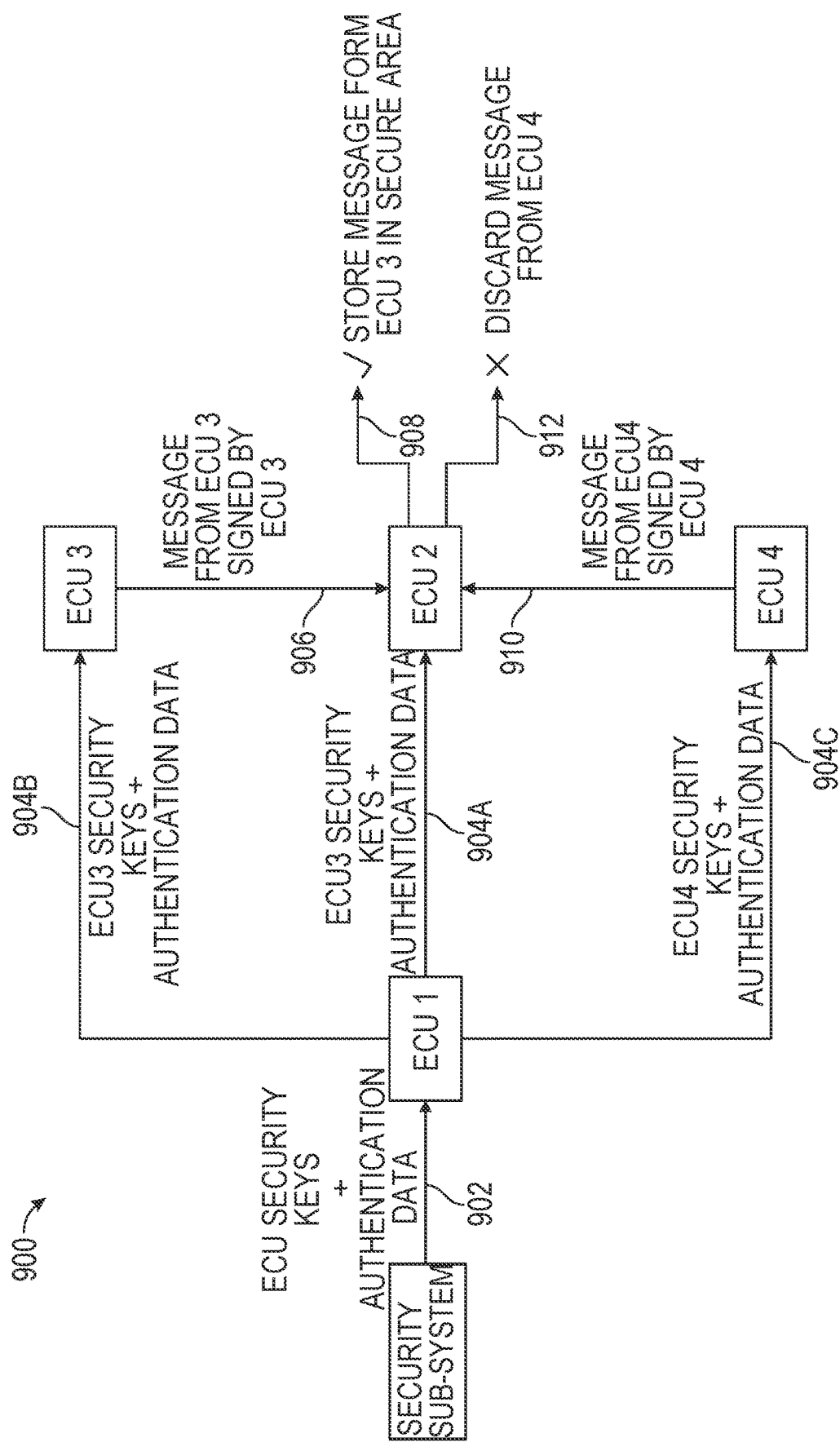
FIG. 9 is a conceptual diagram illustrating interactions between components of a security system in performing a method for securely exchanging messages between ECUs of a vehicle, according to some embodiments.

FIG. 9 is a conceptual diagram illustrating interactions between components of a security system in performing a method 900 for securely exchanging messages between ECUs of a vehicular system, according to some embodiments. In particular, FIG. 9 illustrates interactions between a security sub-system (e.g., the security sub-system 104), and four ECUs—ECU 1, ECU 2, ECU 3, and ECU 4. Each of ECU 1, ECU 2, ECU 3, and ECU 4 is an example of the ECU 800. Further, ECU 1 may correspond to a main ECU (e.g., main ECU 116, 216, or 316).

As shown, at operation 902, the security sub-system provisions ECU 1 (e.g., main ECU 116) with multiple sets of security keys and associated authentication data for authenticating messages exchanged between ECUs. The multiple sets of security keys include a first set of security keys corresponding to ECU 2, a second set of security keys corresponding to ECU 3, and a third set of security keys corresponding to ECU 4.

At operation 904A, ECU 1 provisions ECU 2 with the first set of security keys and associated authentication data. At operation 904B, ECU 1 provisions ECU 3 with the second set of security keys and associated authentication data. At operation 904C, ECU 1 provisions ECU 4 with the third set of security keys and associated authentication data. Each of ECU 2, ECU 3, and ECU 4 may store its respective set of security keys in a secure storage device (e.g., memory 810).

In this example, ECU 2 is permitted to exchange messages with ECU 3, but ECU 2 is not permitted to exchange messages with ECU 4. Thus, the first set of security keys includes one or more security keys to enable ECU 2 to securely communicate with ECU 3, and the second set of security keys includes one or more security keys to enable ECU 3 to securely communicate with ECU 2. For example, the first set of security keys may include a private key for ECU 2 to encrypt and/or cryptographically sign messages and a public key that allows ECU 2 to decrypt messages signed by ECU 3 (e.g., using a private key provisioned to ECU 3). Likewise, the second set of security keys may include a private key for ECU 3 to encrypt messages and a public key that allows ECU 3 to decrypt messages cryptographically signed by ECU 2.

Further, the authentication data provisioned to ECU 2 enables ECU 2 to authenticate messages from ECU 3, but not messages from ECU 4. The authentication data includes one or more attributes that may, for example, include one or more of a temporal attribute that specifies an expiration time or time window for the public key, a message count attribute that specifies a maximum message count for the public key, an operational attribute that specifies one or more operations ECU 3 is permitted to perform, and a component attribute that specifies a component of the vehicle with which ECU 3 is permitted to communicate.

At operation 906, ECU 3 sends a secure message to ECU 2 that is cryptographically signed using a security key from the second set of security keys. Upon receiving the secure message, ECU 2 successfully authenticates the secure message using the authentication data provisioned to ECU 2 and stores the message in a secure storage area (operation 908). As will be discussed further below, the authenticating of the secure message may include comparing the authentication data to an authentication signal.

At operation 910, ECU 4 sends a secure message to ECU 2 that is cryptographically signed using a security key from the third set of security keys. However, as noted above, in this example ECU 2 and ECU 4 are not permitted to exchange messages with one another. Thus, as shown at operation 912, the authentication of the message received from ECU 4 fails. In response to being unable to authenticate the message received from ECU 4, ECU 2 may discard the message, and may further send a signal to ECU 1 to notify ECU 1 of a failed security key authentication.

Figure 10:
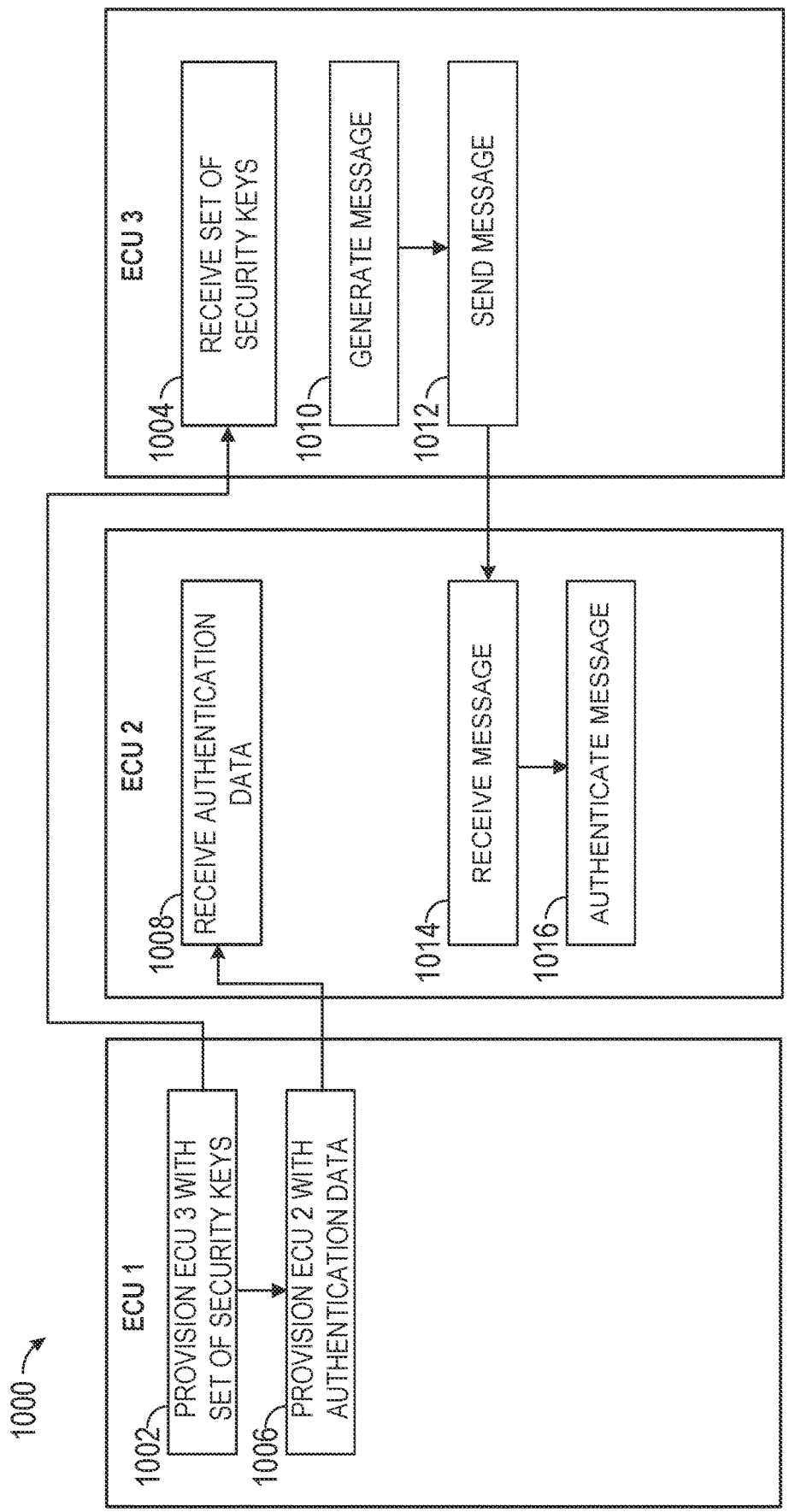
FIGS. 10 and 11 are interaction diagrams illustrating interactions between multiple ECUs of a vehicle in performing a method for securely exchanging messages, according to some embodiments.
Figure 11:
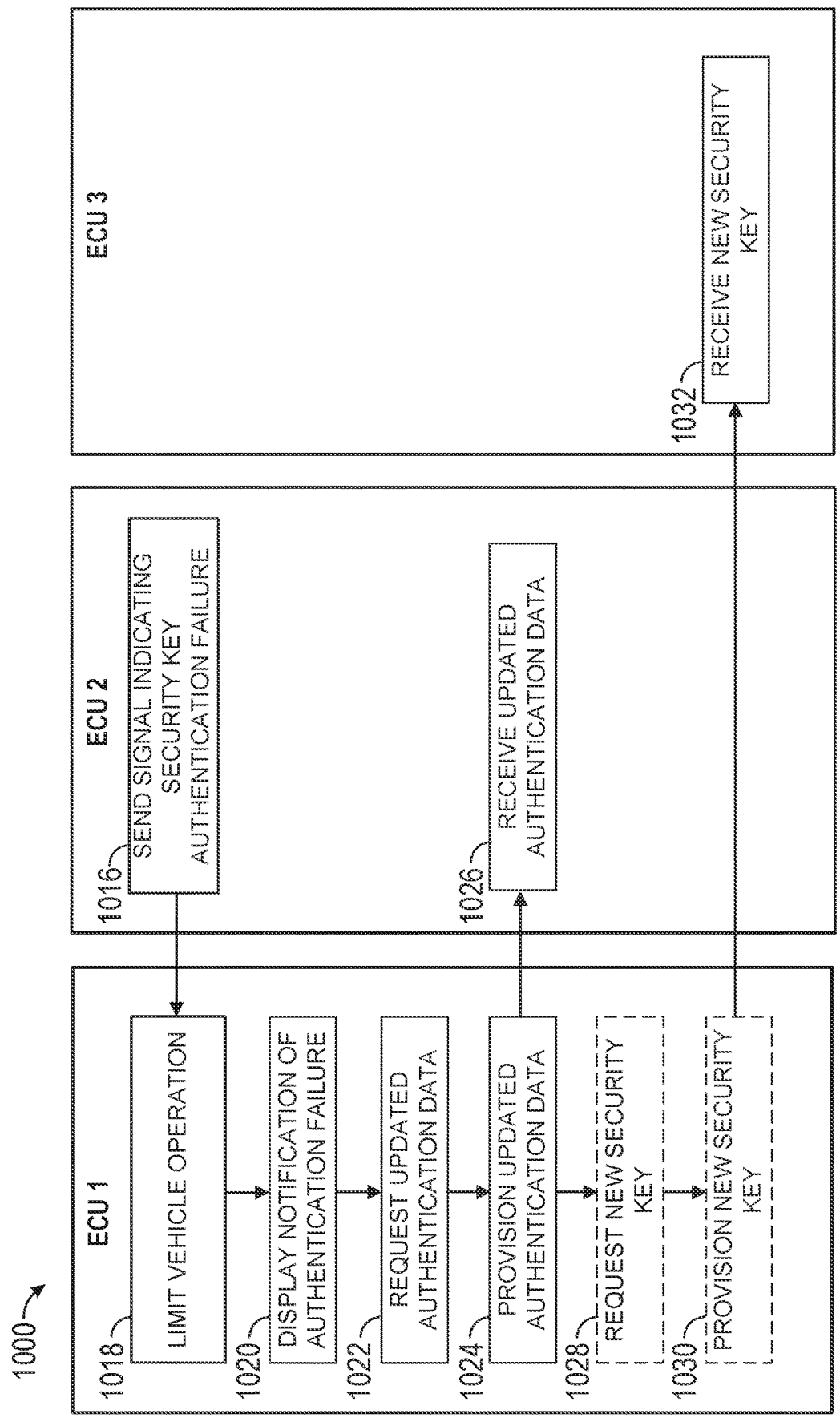

FIGS. 10 and 11 are interaction diagrams illustrating interactions between multiple ECUs of a vehicle in performing a method 1000 for securely exchanging messages, according to some embodiments. More specifically, FIGS. 10 and 11 illustrate interactions between ECU 1, ECU 2, and ECU 3 in performing the method 1000. The method 1000 may be embodied in computer-readable instructions for execution by one or more hardware components (e.g., a processor) such that the operations of the method 1000 may be performed by ECU 1, ECU 2, and ECU 3. As noted above, ECU 1, ECU 2, and ECU 3 are examples of the ECU 800. Further, ECU 1 may correspond to a main ECU (e.g., main ECU 116, 216, or 316).

As shown, the method 1000 begins with ECU 1 (e.g., main ECU 116) provisioning ECU 3 with a set of security keys to enable ECU 3 to exchange messages with one or more ECUs including at least ECU 2 (operation 1002). ECU 3 receives the set of keys at operation 1004.

ECU 1 provisions ECU 2 with authentication data for authenticating messages exchanged with ECU 3 (operation 1006). The authentication data is received by ECU 2 at operation 1008. The authentication data includes one or more attributes related to communication with ECU 3 based on the set of security keys. The one or more attributes may, for example, include one or more of the following: a temporal attribute defining an expiration time for a security key, a temporal attribute defining a time window for sending messages cryptographically signed with a security key, a message count attribute defining a maximum message count for a security key, a component attribute that specifies an identifier of a component of the vehicle with which ECU 3 is permitted to communicate, and an operation attribute that specifies an operation that ECU 3 is able to perform. In some embodiments, the one or more attributes may include a first message count attribute corresponding to authenticated messages and a second message count attribute corresponding to messages with failed authentication.

ECU 3 generates a secure message that is cryptographically signed using a security key from the set of security keys (operation 1010), and ECU 3 sends the secure message to ECU 2 (operation 1012). ECU 2 receives the secure message from ECU 3 (operation 1014) that is cryptographically signed using the security key from the set of security keys provisioned to ECU 3.

ECU 2 uses the authentication data to authenticate the secure message received from ECU 3 (operation 1016). In particular, ECU 2 authenticates the secure message by comparing the authentication data with an authentication signal. The authentication signal may be maintained by ECU 2. In some embodiments, the authentication signal may be maintained by both ECU 2 and ECU 3. Consistent with these embodiments, ECU 3 may cryptographically sign the secure message using a combination of the security key and the authentication signal. Consistent with some embodiments, prior to or as part of the authenticating of the secure message, ECU 2 may decrypt the secure message using one or more security keys provisioned to ECU 2.

In a first example, the one or more attributes include a temporal attribute defining an expiration time for the security key, and the authentication signal includes a clock signal. In the first example, ECU 2 authenticates the secure message from ECU 3 by comparing the expiration time to the clock signal, and if the expiration time has not passed, ECU 2 successfully authenticates the secure message. On the other hand, if the expiration time has passed, the authentication fails, and ECU 2 may send a message to ECU 1 indicating a security key authentication failure with respect to ECU 3.

In a second example, the one or more attributes include a temporal attribute that defines a time window within which messages signed using the security key may be sent, and the authentication signal includes a clock signal. In the second example, ECU 2 authenticates the secure message from ECU 3 by comparing the time window to the clock signal, and if the message was sent within the time window, ECU 2 successfully authenticates the secure message. On the other hand, if the message was sent outside of the time window, the authentication fails, and ECU 2 may send a signal to ECU 1 indicating a security key authentication failure with respect to ECU 3. Further, in the context of the first and second examples, ECU 2 may maintain the clock signal based on one or more clock signal updates provided by a computer system (e.g., the backend server 112) in communication with ECU 1.

In a third example, the one or more attributes include a message count attribute defining a maximum message count that limits the number of messages that may be signed using the security key, and the authentication signal includes a message counter corresponding to the number of messages signed using the security key. In the third example, ECU 2 authenticates the secure message by incrementing the message counter upon receiving the secure message from ECU 3 and comparing the message counter to the maximum message count. If the message counter does not exceed the maximum message count, ECU 2 successfully authenticates the secure message. If the message counter exceeds the maximum message count, the authentication fails, and ECU 2 may send a signal to ECU 1 indicating a security key authentication failure with respect to ECU 3. The message counter maintained by ECU 2 corresponds to messages cryptographically signed using the security key in the set of security keys provisioned to ECU 3. The maximum message count may correspond to successfully authenticated messages or unsuccessfully authenticated messages, and thus, separate message counters may be maintained for successfully authenticated messages and unsuccessfully authenticated messages.

In a fourth example, the one or more attributes include a component attribute that specifies a component of the vehicle with which ECU 3 is permitted to communicate, and ECU 2 authenticates the secure message from ECU 3 by verifying that the secure message relates to operation of the component of the vehicle with which ECU 3 is permitted to communicate.

In a fifth example, the one or more attributes include an operation attribute that specifies an operation ECU 3 is permitted to perform, and ECU 2 authenticates the secure message by verifying that the secure message corresponds to the operation ECU 3 is permitted to perform.

As shown in FIG. 11, the method 1000 may, in some embodiments, include operations 1016, 1018, 1020, 1022, 1024, 1026, 1028, 1030, and 1032. Consistent with some embodiments, the operations 1016, 1018, 1020, 1022, 1024, 1026, 1028, 1030, and 1032 may be performed after the operation 1014 where ECU 2 authenticates the secure message received from ECU 3. As noted above, in some instances, ECU 2 may be unable to successfully authenticate the secure message at operation 1014. In response to ECU 2 being unable to successfully authenticate the secure message, ECU 2 sends a signal to ECU 1 indicating a security key authentication failure with respect to ECU 3 (operation 1016).

Upon receiving the signal from ECU 2, ECU 1 limits operation of the vehicle (operation 1018). ECU 1 may limit operation of the vehicle by placing one or more ECUs in the vehicle in a restricted mode of operation that restricts the one or more ECUs from performing one or more operations (e.g., sending messages). For example, ECU 1 may place ECU 3 in a restricted mode of operation in response to ECU 2 being unable to successfully authenticate the secure message received from ECU 3.

Figure 12:
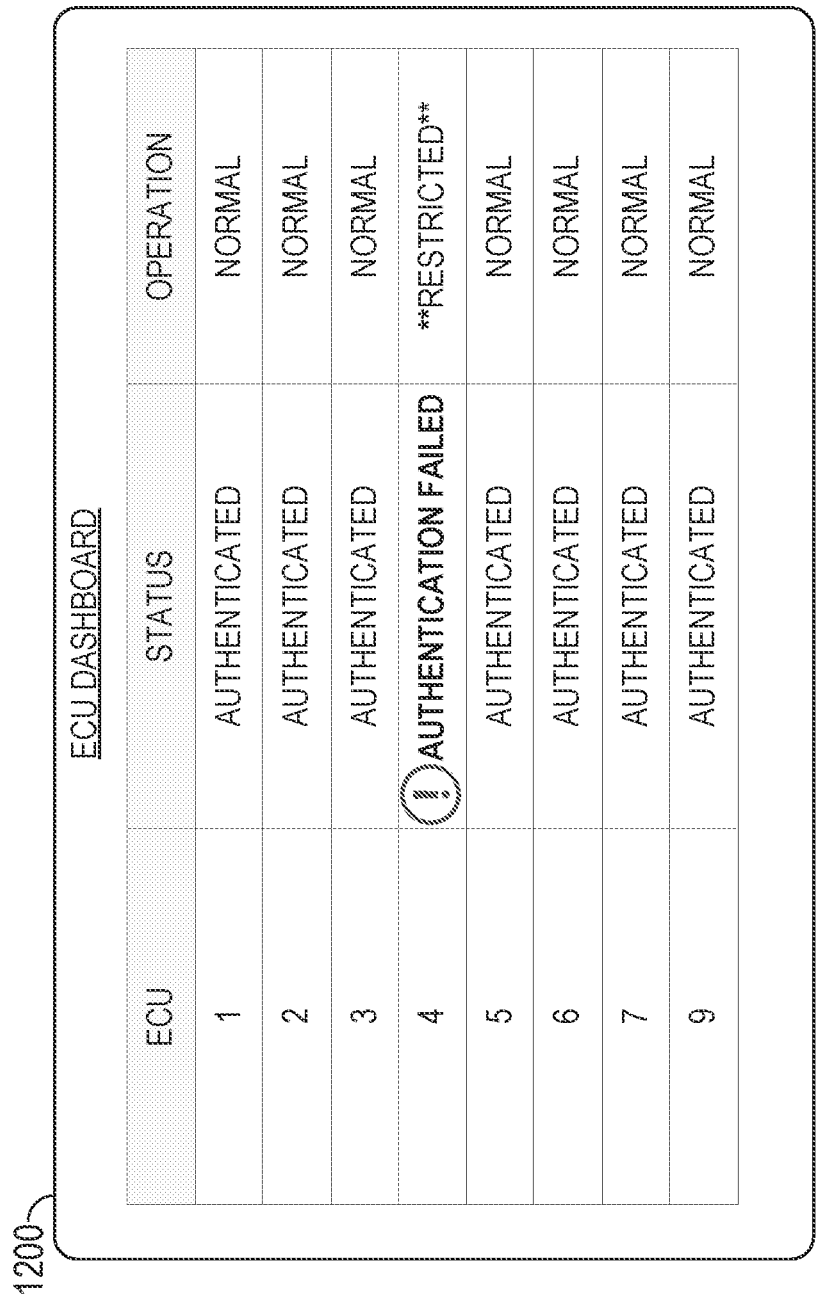
FIG. 12 is an interface diagram illustrating aspects of a graphical interface provided by a security system, according to some embodiments.

Additionally, ECU 1 causes display, on a display device, of a notification of authentication failure with respect to ECU 3 (operation 1020). The display device may be a display device of the vehicle (e.g., a dashboard display device) or a display device of an external computer system (e.g., a diagnostic tool) in communication with ECU 1. The notification may be presented within a graphical interface that provides an authentication and operational status of each ECU in the vehicle. An example of such a graphical interface is illustrated in FIG. 12 and discussed below.

In response to receiving the signal from ECU 2, ECU 1 may also request updated authentication data from a security sub-system (operation 1022). The updated authentication data may, for example, include an updated expiration time for the security key. ECU 1 provisions ECU 2 with the updated authentication data (operation 1024), which is received by ECU 2 at operation 1026.

In some embodiments, ECU 1 may additionally request a new security key for ECU 3, at operation 1028, to replace the security key that led to the failed authentication. ECU 1 provisions ECU 3 with the new security key at operation 1030, and ECU 3 receives the new security key at operation 1032.

Graphical Interface

FIG. 12 is an interface diagram illustrating aspects of a graphical interface 1200 provided by a security system (e.g., security system 100, 200, or 300) according to some embodiments. As shown, the graphical interface 1200 includes a list of ECUs in a vehicle along with an authentication and operational status for each ECU. The graphical interface 1200 may display notifications of failed authentications. For example, in FIG. 12, a notification of authentication failure is presented for "ECU 4" along with a notification that "ECU 4" is in a restricted mode of operation.

Computer System

Figure 13:
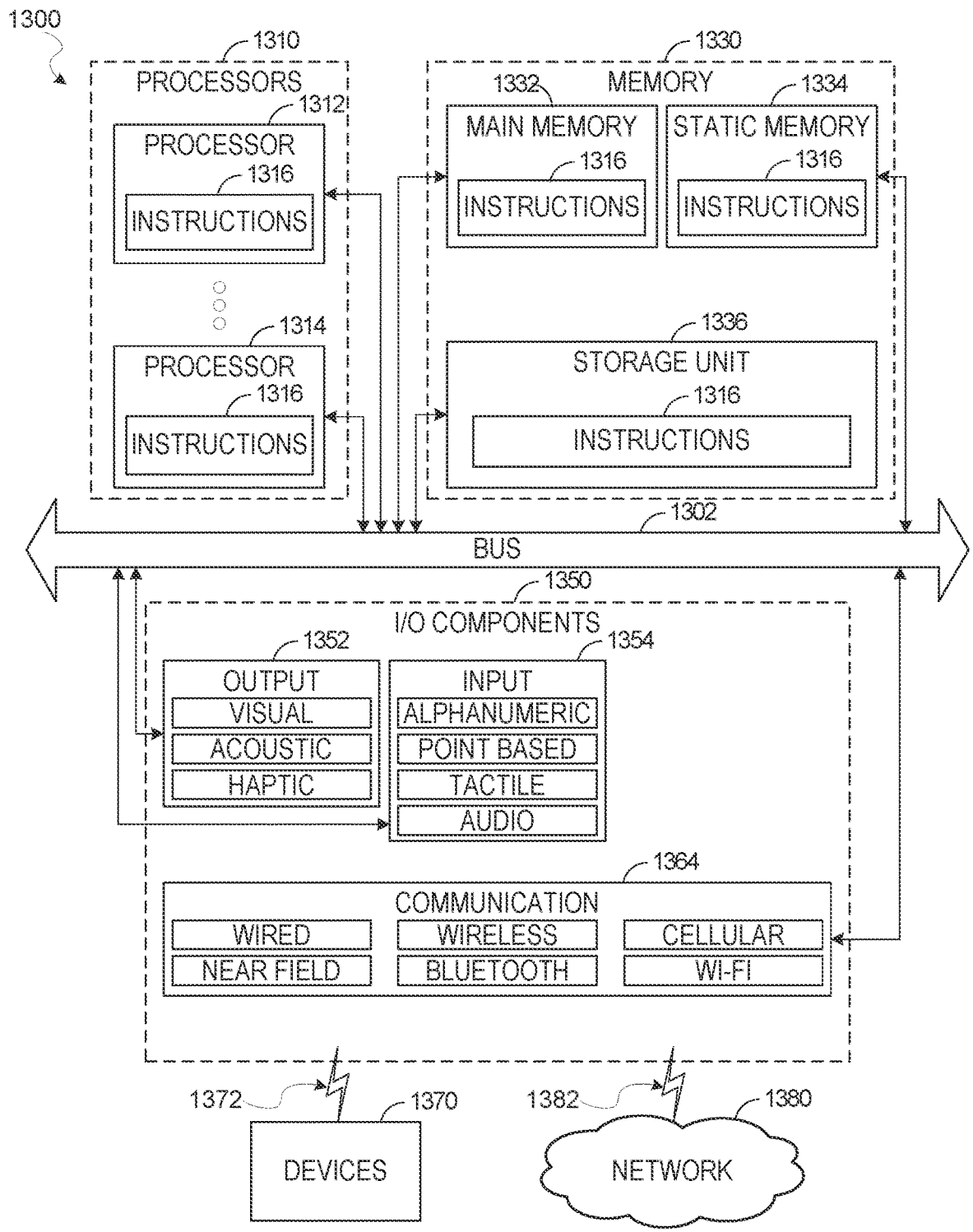
FIG. 13 is a diagrammatic representation of a machine in the example form of a computer system within which a set of instructions for causing the machine to perform any one or more of the methodologies discussed herein may be executed.

FIG. 13 illustrates a diagrammatic representation of a machine 1300 in the form of a computer system within which a set of instructions may be executed for causing the machine 1300 to perform any one or more of the methodologies discussed herein, according to an example embodiment. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the machine 1300 may correspond to any one of the frontend servers 110 and 210, the backend servers 112 and 212, the OBD systems 120, 220, and 320, the IVI systems 122, 222, and 322, the dongle 312, the ECU 800, and any examples thereof. Further, the instructions 1316 may cause the machine 1300 to execute any one of the methods 400, 500, 600, 700, 900, or 1000. The instructions 1316 transform the general, non-programmed machine 1300 into a particular machine 1300 programmed to carry out the described and illustrated functions in the manner described here. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors 1310 that may comprise two or more independent processors (sometimes referred to as "cores") that may execute instructions contemporaneously. Although FIG. 13 shows multiple processors, the machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336, each accessible to the processors 1310 such as via the bus 1302. The main memory 1332, the static memory 1334, and the storage unit 1336 store the instructions 1316 embodying any one or more of the methodologies or functions described herein. The instructions 1316 may also reside, completely or partially, within the main memory 1332, within the static memory 1334, within the storage unit 1336, within at least one of the processors 1310 (e.g., within the processor's cache memory), or any suitable combination thereof, during execution thereof by the machine 1300.

The I/O components 1350 may include a wide variety of components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion, and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or another suitable device to interface with the network 1380. In further examples, the communication components 1364 may include wired communication components, wireless communication components, cellular communication components, near field communication components, Bluetooth communication components, and Wi-Fi communication components. The devices 1370 may be another machine or any of a wide variety of peripheral devices (e.g., a peripheral device coupled via a universal serial bus (USB)).

Executable Instructions and Machine-Storage Medium

The various memories (e.g., 1330, 1332, 1334, and/or memory of the processor(s) 1310) and/or the storage unit 1336 may store one or more sets of instructions and data structures (e.g., software) embodying or utilized by any one or more of the methodologies or functions described herein. These instructions, when executed by the processor(s) 1310, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1316 and/or data. The terms shall accordingly be taken to include, but not be limited to, solid-state memories, and optical and magnetic media, including memory internal or external to the processors 1310. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 1380 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to the devices 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
a first electronic control unit (ECU) of a plurality of ECUs in a vehicle;
a second ECU of the plurality of ECUs; and
a third ECU of the plurality of ECUs; and wherein:
the first ECU is configured to initiate secure communication between the second ECU and the third ECU by performing first operations comprising:
provisioning the third ECU with a set of security keys that enable the third ECU to securely exchange messages with the second ECU; and
provisioning the second ECU with authentication data usable to authenticate the messages exchanged between the second ECU and the third ECU, the authentication data including a message count attribute that defines a maximum message count for a security key among the set of security keys provisioned to the third ECU; and
the second ECU is configured to perform second operations comprising:
receiving, from the third ECU, a secure message that is signed using the security key among the set of security keys provisioned to the third ECU; and
authenticating the secure message by comparing the authentication data with an authentication signal maintained by the second ECU, the authentication signal including a message count that quantifies messages signed using the security key, the comparing of the authentication data with the authentication signal including:
updating the message count that quantifies the messages signed using the security key in response to reception of the secure message from the third ECU; and
comparing the message count to the maximum message count.

2. The system of claim 1, wherein:
the authentication data provisioned to the second ECU includes a temporal attribute that defines an expiration time for the security key;
the authentication signal maintained by the second ECU includes a clock signal; and
the comparing of the authentication data with the authentication signal includes comparing the expiration time to the clock signal.

3. The system of claim 2, wherein the second ECU is configured to maintain the clock signal based on one or more clock updates provided by a computer system in communication with the first ECU.

4. The system of claim 2, wherein the first operations of the first ECU further comprise:
requesting, from a computer system of a security system, updated authentication data that includes an expiration update to the expiration time for the security key; and
provisioning the second ECU with the updated authentication data for the security key.

5. The system of claim 1, wherein:
the authentication data provisioned to the second ECU includes a temporal attribute that defines a time window for sending messages signed using the security key;
the authentication signal maintained by the second ECU includes a clock signal; and
the comparing of the authentication data with the authentication signal includes comparing time window to the clock signal.

6. The system of claim 1, wherein:
the authentication data provisioned to the second ECU includes a component attribute that specifies an identifier of a vehicle component with which the third ECU is permitted to communicate; and
the second operations performed by the second ECU further comprise:
verifying that the secure message corresponds to the vehicle component with which the third ECU is permitted to communicate.

7. The system of claim 1, wherein:
the authentication data provisioned to the second ECU includes an operation attribute that specifies an operation that the third ECU is permitted to perform; and
the second operations performed by the second ECU further comprise:
verifying that the secure message corresponds to the operation that the third ECU is permitted to perform.

8. The system of claim 1, wherein the secure message is signed using a combination of the authentication signal and the security key.

9. The system of claim 1, wherein the second operations performed by the second ECU further comprise sending an alert signal to the first ECU in response to the second ECU being unable to authenticate the secure message received from the third ECU, the alert signal indicating a security key authentication failure that corresponds to the third ECU.

10. The system of claim 9, wherein the first operations performed by the first ECU further comprise limiting operation of the vehicle in response to receiving the alert signal from the second ECU.

11. The system of claim 10, wherein the first operations performed by the first ECU further comprise limiting the operation of the vehicle by placing the third ECU into a restricted operational mode that restricts the third ECU from performing one or more operations.

12. The system of claim 9, wherein the first operations performed by the first ECU further comprise requesting, from a computer system of a security service, a new security key for the third ECU in response to receiving the alert signal from the second ECU.

13. The system of claim 1, wherein the first operations performed by the first ECU further comprise:
receiving, from a computer system of a security service, a plurality of digital certificates, each corresponding to a different one of the plurality of ECUs;

sending, to a server computer of a firmware service, a request for firmware configuration data for the plurality of ECUs, the request including the plurality of digital certificates;

receiving, from the server computer of the firmware service, the firmware configuration data for the plurality of ECUs; and causing, using the firmware configuration data, firmware of each ECU among the plurality of ECUs to be configured.

14. The system of claim 13, wherein:

each ECU of the plurality of ECUs initially includes a portion of program code, each ECU being unable to fully operate using the portion of the program code; and the firmware of each ECU, once configured using the firmware configuration data, causes each ECU to include the program code that enables each ECU to fully operate.

15. A system comprising:

one or more first processors of a first electronic control unit (ECU) of a plurality of ECUs in a vehicle;

a first memory of the first ECU, the first memory storing:
authentication data usable to authenticate messages exchanged between a second ECU of the plurality of ECUs and a third ECU of the plurality of ECUs, the authentication data usable to authenticate the messages exchanged between the second ECU and the third ECU; and first instructions that, when executed by the one or more first processors, cause the first ECU to perform first operations comprising:
provisioning the third ECU with a set of security keys that enable the third ECU to securely exchange messages with the second ECU; and
provisioning the second ECU with the authentication data, the authentication data including a message count attribute that defines a maximum message count for a security key among the set of security keys;

one or more second processors of the second ECU; and a second memory of the second ECU, the second memory storing second instructions that, when executed by the one or more second processors, cause the second ECU to perform second operations comprising:
receiving, from the third ECU, a secure message that is signed using the security key among the set of security keys provisioned to the third ECU; and
authenticating the secure message by comparing the authentication data with an authentication signal maintained by the second ECU, the authentication signal including a message count that quantifies messages signed using the security key, the comparing of the authentication data with the authentication signal including:
updating the message count that quantifies the messages signed using the security key in response to reception of the secure message from the third ECU; and
comparing the message count to the maximum message count.

16. The system of claim 15, wherein the authentication data provisioned to the second ECU includes at least one of:
a first temporal attribute that defines an expiration time for the security key,
a second temporal attribute that defines a time window for sending messages signed using the security key,
a component attribute that specifies an identifier of a vehicle component with which the third ECU is permitted to communicate, or
an operation attribute that specifies an operation that the third ECU is permitted to perform.

17. The system of claim 15, wherein:

the second operations performed by the second ECU further comprise sending an alert signal to the first ECU in response to the second ECU being unable to authenticate the secure message received from the third ECU, the alert signal indicating a security key authentication failure that corresponds to the third ECU; and the first operations performed by the first ECU further comprise:
limiting operation of the vehicle in response to receiving the alert signal from the second ECU; and
requesting, from a computer system of a security service, a new security key for the third ECU in response to receiving the alert signal from the second ECU.

18. A non-transitory computer-readable medium storing instructions that, when executed by at least one processor, cause the at least one processor to perform operations comprising:
configuring a first electronic control unit (ECU) of a plurality of ECUs that include a second ECU and a third ECU, in a vehicle, to perform first operations comprising:
provisioning the third ECU with a set of security keys that enable the third ECU to securely exchange messages with the second ECU; and
provisioning the second ECU with authentication data usable to authenticate the messages exchanged between the second ECU and the third ECU, the authentication data including a message count attribute that defines a maximum message count for a security key among the set of security keys provisioned to the third ECU; and
configuring the second ECU to perform second operations comprising:
receiving, from the third ECU, a secure message that is signed using the security key among the set of security keys provisioned to the third ECU; and
authenticating the secure message by comparing the authentication data with an authentication signal maintained by the second ECU, the authentication signal including a message count that quantifies messages signed using the security key, the comparing of the authentication data with the authentication signal including:
updating the message count that quantifies the messages signed using the security key in response to reception of the secure message from the third ECU; and
comparing the message count to the maximum message count.

19. The non-transitory computer-readable medium of claim 18, wherein the authentication data provisioned to the second ECU includes at least one of:
a first temporal attribute that defines an expiration time for the security key,
a second temporal attribute that defines a time window for sending messages signed using the security key,
a component attribute that specifies an identifier of a vehicle component with which the third ECU is permitted to communicate, or an operation attribute that specifies an operation that the third ECU is permitted to perform.

20. The non-transitory computer-readable medium of claim 18, wherein:
the second operations performed by the second ECU further comprise sending an alert signal to the first ECU in response to the second ECU being unable to authenticate the secure message received from the third ECU, the alert signal indicating a security key authentication failure that corresponds to the third ECU; and
the first operations performed by the first ECU further comprise:
limiting operation of the vehicle in response to receiving the alert signal from the second ECU; and
requesting, from a computer system of a security service, a new security key for the third ECU in response to receiving the alert signal from the second ECU.

* * * * *